United States Patent
Althoff et al.

(10) Patent No.: US 6,374,252 B1
(45) Date of Patent: *Apr. 16, 2002

(54) MODELING OF OBJECT-ORIENTED DATABASE STRUCTURES, TRANSLATION TO RELATIONAL DATABASE STRUCTURES, AND DYNAMIC SEARCHES THEREON

(75) Inventors: James Althoff, Los Altos; Seung Lee, San Jose, both of CA (US); Ken Belanger, Hudson, NH (US); Nagendra Prasad, Padmanabhangar (IN); Brian McGinnis, Danville, CA (US); Floyd McWilliams, Palo Alto, CA (US); Yong Zhang, Sunnyvale, CA (US); Ravi Koushik, Mountain View, CA (US)

(73) Assignee: i2 Technologies US, Inc., Dallas, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/951,714

(22) Filed: Oct. 16, 1997

(Under 37 CFR 1.47)

Related U.S. Application Data

(63) Continuation of application No. 08/521,667, filed on Aug. 31, 1995, now abandoned, which is a continuation of application No. 08/428,003, filed on Apr. 24, 1995, now abandoned.

(51) Int. Cl.[7] .............................................. G06F 17/30
(52) U.S. Cl. ........................ 707/102; 707/100; 707/103
(58) Field of Search ............................. 707/1, 103, 102, 707/100, 101, 104

(56) References Cited

U.S. PATENT DOCUMENTS

| | | | |
|---|---|---|---|
| 4,930,071 A | 5/1990 | Tou et al. .................... | 364/300 |
| 5,133,075 A | 7/1992 | Risch ........................... | 395/800 |
| 5,161,225 A | 11/1992 | Abraham et al. ............ | 395/600 |

(List continued on next page.)

OTHER PUBLICATIONS

R.G.G. Cattell, "Object Data Management—Object–Oriented and Extended Relational Database Systems", bibliography, pp. 273–310.

(List continued on next page.)

Primary Examiner—Frantz Coby
(74) Attorney, Agent, or Firm—Baker Botts L.L.P.

(57) ABSTRACT

A method and system for modeling of object-oriented database structures, translation to relational database structures, and dynamic searches thereon. The user may create, edit and manipulate a user's object database (dynamically translated into a set of relational database structures), to create, edit and manipulate objects for that object database (dynamically translated into data for those relational database structures), and to create, edit and manipulate queries to be applied to that object database (dynamically translated into queries to be applied to those relational database structures). A meta-model of the user's object database, which is itself an object database, and which has itself been translated into a set of relational database structures for manipulation by a relational database engine. The meta-model comprises a set of classes, objects, and relationships between classes which model the classes and relationships between classes of the system. Each of these classes may comprise a set of searchable properties, and each of these relationships may comprise an inheritance relationship (between a base class and a derived class) or a data-model relationship (such as a one-to-one, one-to-many, or many-to-many relationship). The data model of the user's object database is modeled by actual objects in the meta-model, and editing or manipulating the user's object database is modeled by creating, modifying, or deleting objects in the meta-model. The meta-model also models itself, in the same manner as it models the user's object database, and may be manipulated in the same manner as the user's object database.

36 Claims, 8 Drawing Sheets

U.S. PATENT DOCUMENTS

| | | | |
|---|---|---|---|
| 5,181,162 A | | 1/1993 | Smith et al. ................. 364/419 |
| 5,201,046 A | | 4/1993 | Goldberg et al. ........... 395/600 |
| 5,212,787 A | | 5/1993 | Baker et al. ................. 395/600 |
| 5,235,701 A | * | 8/1993 | Ohler et al. ................. 395/600 |
| 5,261,080 A | * | 11/1993 | Khoyi et al. ................. 395/500 |
| 5,291,583 A | | 3/1994 | Bapat .......................... 395/500 |
| 5,295,256 A | | 3/1994 | Bapat .......................... 395/600 |
| 5,295,261 A | * | 3/1994 | Simonetti ................... 395/600 |
| 5,303,379 A | * | 4/1994 | Khoyi et al. ................. 395/700 |
| 5,317,742 A | * | 5/1994 | Bapat .......................... 395/700 |
| 5,398,336 A | | 3/1995 | Tantry et al. ............... 395/600 |
| 5,421,015 A | * | 5/1995 | Khoyi et al. ................. 395/650 |
| 5,426,780 A | * | 6/1995 | Gerull et al. ............... 707/103 |
| 5,437,027 A | * | 7/1995 | Bannon et al. ............. 707/103 |
| 5,448,727 A | * | 9/1995 | Annevelink ................... 707/7 |
| 5,499,371 A | * | 3/1996 | Henninger et al. ......... 395/700 |
| 5,504,885 A | * | 4/1996 | Alashqur .................... 707/103 |
| 5,548,749 A | * | 8/1996 | Kroenke et al. ............ 395/600 |
| 5,596,746 A | * | 1/1997 | Shen et al. ................. 395/612 |
| 5,615,362 A | * | 3/1997 | Jensen et al. ............... 395/614 |
| 5,765,159 A | * | 6/1998 | Srinivasan .................. 707/102 |
| 5,799,309 A | * | 8/1998 | Srinivasan .................. 707/102 |
| 5,873,093 A | * | 2/1999 | Williamson et al. ........ 707/103 |
| 6,122,641 A | * | 9/2000 | Williamson et al. ........ 707/103 |
| 6,223,227 B1 | * | 4/2001 | Willianson et al. ......... 709/315 |

OTHER PUBLICATIONS

"Object–Oriented Database Management—Applications in Engineering and Computer Science", bibliography, pp. 631–662.

Donald K. Burleson, "Practical Application of Object–Oriented Techniques to Relational Databases", bibliography, pp. 243–247.

Setrag Khoshafian, "Object–Oriented Databases", bibliography, pp. 335–350.

Kroenke, Business Modeling with Semantic Objects, Wall Data Inc, pp. 1–4, Dec. 1994.*

* cited by examiner

MODELING OF OBJECT-ORIENTED DATABASE STRUCTURES, TRANSLATION TO RELATIONAL DATABASE STRUCTURES, AND DYNAMIC SEARCHES THEREON

CROSS-REFERENCE TO RELATED APPLICATION

This is a file-wrapper continuation of U.S. patent application Ser. No. 08/521,667, filed Aug. 31, 1995 now abandoned which is a continuation of 08/428,003 filed Apr. 24, 1995 abandoned.

BACKGROUND OF THE INVENTION

1. Field of the Invention

This invention relates to modeling of object-oriented database structures, translation to relational database structures, and dynamic searches thereon.

2. Description of Related Art

In the design of computer software systems, it is considered superior to associate each data item with a data type, and to present a relatively uniform interface to objects of each data type to all elements of the system. This technique allows elements of the system to rely on the characteristics of the data type, of the uniform interface to that data type, and of the relationships between that data type and other data types. In addition to so-called "built in" data types, such as integers and floating point numbers, it is also superior to extend this technique to more complex data types, sometimes called "classes," including classes defined by a user of the system. (For example, a user might define a class called telephone number and thus allow elements of the system to store, manipulate, or retrieve telephone numbers as if they were fundamental pieces of information.) Techniques of defining classes of software objects and restricting access to those objects are now common with some programming languages, such as the C++ and Smalltalk programming languages, called object-oriented programming languages ("OOPL").

Recently it has been found that the technique of defining classes of software objects and manipulating those objects has been useful for database applications as well. In object-oriented database ("OODB") applications, a user defines classes of objects, properties of those classes, and relationships between those classes, and populates a database with data items which are instances of those objects. (For example, the class telephone number might be used to store telephone numbers for persons, companies, and computer networks.) It has been found that object-oriented database management presents the advantages of rapid application and database development and of relative software reliability.

However, one problem which has arisen in the art is that many database systems have been designed to operate with another, different database technique, known as "relational database" management (RDBM). In a relational database, the database comprises a set of data tables which represent the relationships between data items. Each table comprises a set of records, one record for each data item; each record comprises a set of columns or fields, one column for each data value associated with the data item. (For example, each record in a table of persons might have a column defined for that person's telephone number; similarly, each record in a table of companies might have a column defined for that company's telephone number.) Relational databases have been found to be successful and efficient in managing large databases. Due to their success, there is a substantial investment in relational database management systems, and in applications and computer programs which support or interface to relational database management systems.

It would be advantageous to obtain the advantages of object-oriented database management, while retaining the efficiency of, and the installed investment in, relational database management systems.

One problem which has arisen in the art is that the tools for creating, implementing, and manipulating object-oriented databases are generally inconsistent with the tools for creating, implementing, and manipulating relational databases.

U.S. Pat. No. 5,291,583, "Automatic Storage of Persistent ASN.1 Objects in a Relational Schema", issued Mar. 1, 1994, in the name of inventor Subodh Bapat, and, assigned to Racal-Datacom, Inc., and U.S. Pat. No. 5,295,256, "Automatic Storage of Persistent Objects in a Relational Schema", issued Mar. 15, 1994, also in the name of inventor Subodh Bapat, and also assigned to Racal-Datacom, Inc., show a method for compiling structures defined using an object-oriented programming language, such as C++ or Smalltalk, into a relational database structure. However, while the method shown in these patents generally achieves the goal of creating a relational database structure for persistent storage of objects, it is generally inadequate to the other tasks demanded of a database application, including dynamically modifying the object hierarchy and object relationships, populating the database, dynamically populating and editing the objects in the database, and dynamically generating and performing searches against the database.

The following patents are examples of the art:

U.S. Pat. No. 5,398,336, "Object-Oriented Architecture for Factory Floor Management", issued Mar. 14, 1995, in the name of inventors Subhash B. Tantry, et al., and assigned to Consilium, Inc.

U.S. Pat. No. 5,212,787, "Method and Apparatus for Accessing A Relational Database Without Exiting An Object-Oriented Environment", issued May 18, 1993, in the name of inventors Ronald B. Baker, et al., and assigned to International Business Machines Corporation.

U.S. Pat. No. 5,201,046, "Relational Database Management System and Method for Storing, Retrieving and Modifying Directed Graph Data Structures", issued Apr. 6, 1993, in the name of inventors Robert N. Goldberg, et al., and assigned to Xidak, Inc.

U.S. Pat. No. 5,181,162, "Document Management and Production System", issued Jan. 19, 1993, in the name of inventors Robert M. Smith, et al., and assigned to Eastman Kodak Company.

U.S. Pat. No. 5,161,225, "Persistent Stream for Processing Time Consuming and Reusable Queries in An Object Oriented Database Management System", issued Nov. 3, 1992, in the name of inventors Robert L. Abraham, et al., and assigned to International Business Machines Corporation.

U.S. Pat. No. 5,133,075, "Method of Monitoring Changes in Attribute Values of Objects in An Object-Oriented Database", issued Jul. 21, 1992, in the name of inventor Tore J. M. Risch, and assigned to Hewlett-Packard Company.

U.S. Pat. No. 4,930,071, "Method for Integrating A Knowledge-Based System with An Arbitrary Database System", issued May 29, 1990, in the name of inventors Frederich N. Tou, et al., and assigned to IntelliCorp, Inc.

Accordingly, it would be advantageous to provide a method of compilation and translation between object-oriented and relational database structures which obtains the advantages of object-oriented database applications, while retaining the ability to use present relational database management systems.

SUMMARY OF THE INVENTION

The invention provides a method and system for modeling of object-oriented database structures, translation to relational database structures, and dynamic searches thereon. The invention thus allows a user to create, edit and manipulate a user's object database (which the method and system dynamically translates into a set of relational database structures), to create, edit and manipulate objects for that object database (which the method and system dynamically translates into data for those relational database structures), and to create, edit and manipulate queries to be applied to that object database (which the method and system dynamically translates into queries to be applied to those relational database structures).

The method and system includes a meta-model of the user's object database, which is itself an object database, and which has itself been translated into a set of relational database structures for manipulation by a relational database engine. The meta-model comprises a set of classes, objects, and relationships between classes which model the classes and relationships between classes of the system. Each of these classes may comprise a set of searchable properties, and each of these relationships may comprise an inheritance relationship (between a base class and a derived class) or a data-model relationship (such as a one-to-one, one-to-many, or many-to-many relationship). The data model of the user's object database is modeled by actual objects in the meta-model, and editing or manipulating the user's object database is modeled by creating, modifying, or deleting objects in the meta-model. The meta-model also models itself, in the same manner as it models the user's object database, and may be manipulated in the same manner as the user's object database.

In a preferred embodiment, each class in the user's object database is modeled by a relational database table, each searchable property of that class is modeled by a column in that table, and each object of that class is modeled by a row in that table and corresponding rows in tables representing base classes for that object. Each such table comprises an "object-ID" column generated by the system, comprising a unique ID for each object in the system. Each relationship between two objects is modeled by providing a pointer from the first object to the second object; the pointer comprises a column (generated by the system to model the relationship) in the first object's table with the object-ID of the second object. These relational database structures are created, modified, or deleted dynamically or incrementally in response to user commands to create, edit, and manipulate the user's object database.

At least two types of relationship are modeled by the system, inheritance relationships and data-model relationships. An inheritance relationship exists between a base class and a derived class. An object member of the derived class is entered in both the table for the base class and the table for the derived class, and it is given the same object-ID in both tables. The inheritance relationship between the two classes is modeled by a relational database JOIN between the two tables on the "object-ID" column. For multiple inheritance, an object with the same object-ID is entered in the derived class and in each of the multiple base classes.

A data-model relationship is created by the user for the user's object database, and may comprise a one-to-one, many-to-one, or many-to-many relationship. One-to-one and many-to-one relationships are modeled by providing a pointer from the first object to the second object. Many-to-many relationships are modeled by providing a cross-link class, implemented using a table having one column for the first class having the object-ID of the first object in the many-to-many relationship, one column for the second class having the object-ID of the second object in the many-to-many relationship, and having one row for each pair of actually related objects. One-to-one and many-to-one relationships are modeled by a relational database JOIN between the two corresponding tables on the column modeling the data-model relationship; many-to-many relationships are modeled by a relational database JOIN between the two corresponding tables and the cross-link table, on the two columns modeling the data-model relationship.

The method and system includes a query model which provides for querying the user's object database with a search that may be cascaded across multiple classes of objects. The user selects one or more classes to be searched, restrictions on searchable properties of objects in those classes (such as having specific values for those searchable properties), and information to be presented for objects in those classes. In response to this search description, the system generates a relational database query (preferably comprising an optimized SQL command) to be applied to the relational database structures corresponding to the user's object database, automatically including any commands needed to implement the inheritance relationships and data-model relationships of the user's object database. A preferred embodiment provides for automatic unit conversion of searchable properties' values. When the relational database query is applied to the relational database, the system receives information supplied from the relational database and presents it to the user according to display properties of the classes which were searched.

In a preferred embodiment, the meta-model comprises a first set of predefined classes for modeling access control to aspects of the user's object database. Access may be restricted to selected users or to selected user groups, and may be specified for individual objects, classes of objects, or properties of those objects. In a preferred embodiment, the meta-model also comprises a second set of predefined classes for modeling attachment of graphic and text objects to objects in the user's object database. Graphic and text objects may be associated with objects in the user's object database, and may be associated with system files and other objects maintained by an operating system in which the meta-model is embedded.

DESCRIPTION OF THE PREFERRED EMBODIMENT

In the following description, a preferred embodiment of the invention is described with regard to preferred process steps, data structures, and user interface. However, those skilled in the art would recognize, after perusal of this application, that embodiments of the invention may be implemented using a general purpose computer, or a set of general purpose computers, operating under program control, and that modification of a general purpose computer, or a set of general purpose computers, to implement the process steps, data structures, and user interface described herein would not require either invention or undue experimentation.

Example User's Object Database

Figure 1:
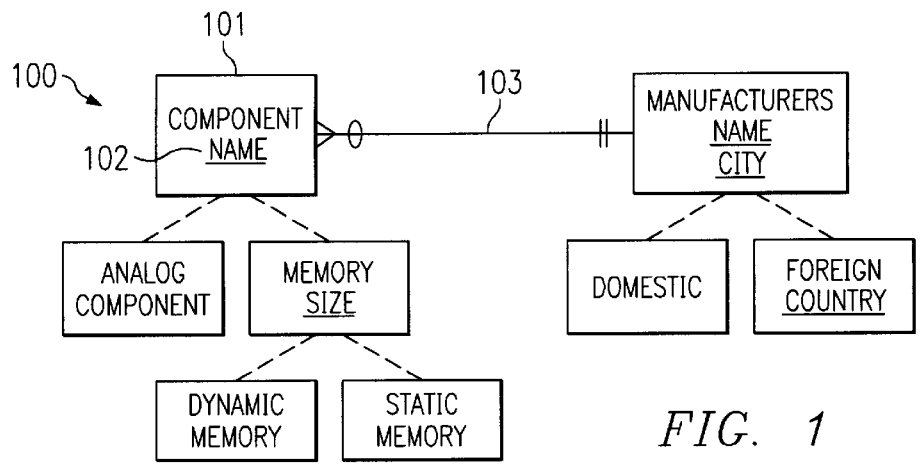
FIG. 1 shows a data model diagram of an example user's object database.

FIG. 1 shows a data model diagram of an example user's object database. This example is presented so as to support examples of modeling the object database, translation of the object database into a relational database, and examples of database operations performed on the object database.

An example user's object database 100 comprises a set of classes 101, each comprising a set of searchable properties 102, and each representing a type of data for an object-oriented database to store, manipulate, or retrieve. The classes 101 form a hierarchy (more precisely, a directed acyclic graph), in which each class 101 may be derived from zero or more base classes 101, and each class 101 may be a base class for zero or more derived classes 101. When a derived class 101 is derived from a base class 101, it inherits all the searchable properties 102 of the base class 101, and may have additional searchable properties 102 particular to the derived class 101.

In this example, the object database 100 comprises a class 101 component, which the semantics of the object database 100 define to be an electrical circuit component. Each object of the class 101 component has a searchable property 102 "name", which the semantics of the object database 100 define to be the name of that component.

In this example, the class 101 component is a base class, from which two classes 101 analog component and memory are derived. Because these two classes 101 are derived from the class 101 component, they inherit all the properties of the class 101 component, so each object of the class 101 analog component and each object of the class 101 memory also has a searchable property 102 "name". In this example, each object of the class 101 memory has an additional searchable property 102 "size".

The class 101 memory is also a base class, from which the two classes 101 dynamic memory and static memory are derived. Accordingly, they inherit all the properties of the class 101 memory and therefore also of the class 101 component, so each object of the class 101 static memory has "name" and "size" as searchable properties 102.

Another example class 101 is manufacturer. In this example, each object of the class 101 manufacturer has "name" and "city" as searchable properties 102. In this example, the class 101 manufacturer is a base class, from which the classes 101 domestic manufacturer and foreign manufacturer are derived. The class 101 foreign manufacturer also has a searchable property 102 "country".

In this example, the class 101 component has a data-model relationship 103 with the class 101 manufacturer. This relationship 103 is many-to-one; each object of the class 101 component has a related object of the class 101 manufacturer, while each object of the class 101 manufacturer has zero or more related objects of the class 101 component.

In addition to searchable properties 102, each object of a derived class 101 also inherits the relationships 103 of its base class 101. Thus, each object of the class 101 static memory inherits the relationships 103 of the class 101 memory, which inherits the relationships 103 of the class 101 component. One of the relationships 103 of the class 101 component is a relationship 103 with the class 101 manufacturer, so each static memory has a manufacturer. Similarly, each foreign manufacturer may make static memories, dynamic memories, and analog components.

Those skilled in the art would easily recognize, after perusal of this application, a large number of variants on this example user's object database, and the ready applicability of the methods and systems disclosed herein to such variants. Applicability of the methods and systems disclosed herein would not require either invention or undue experimentation.

System for Complication and Translation

Figure 2:
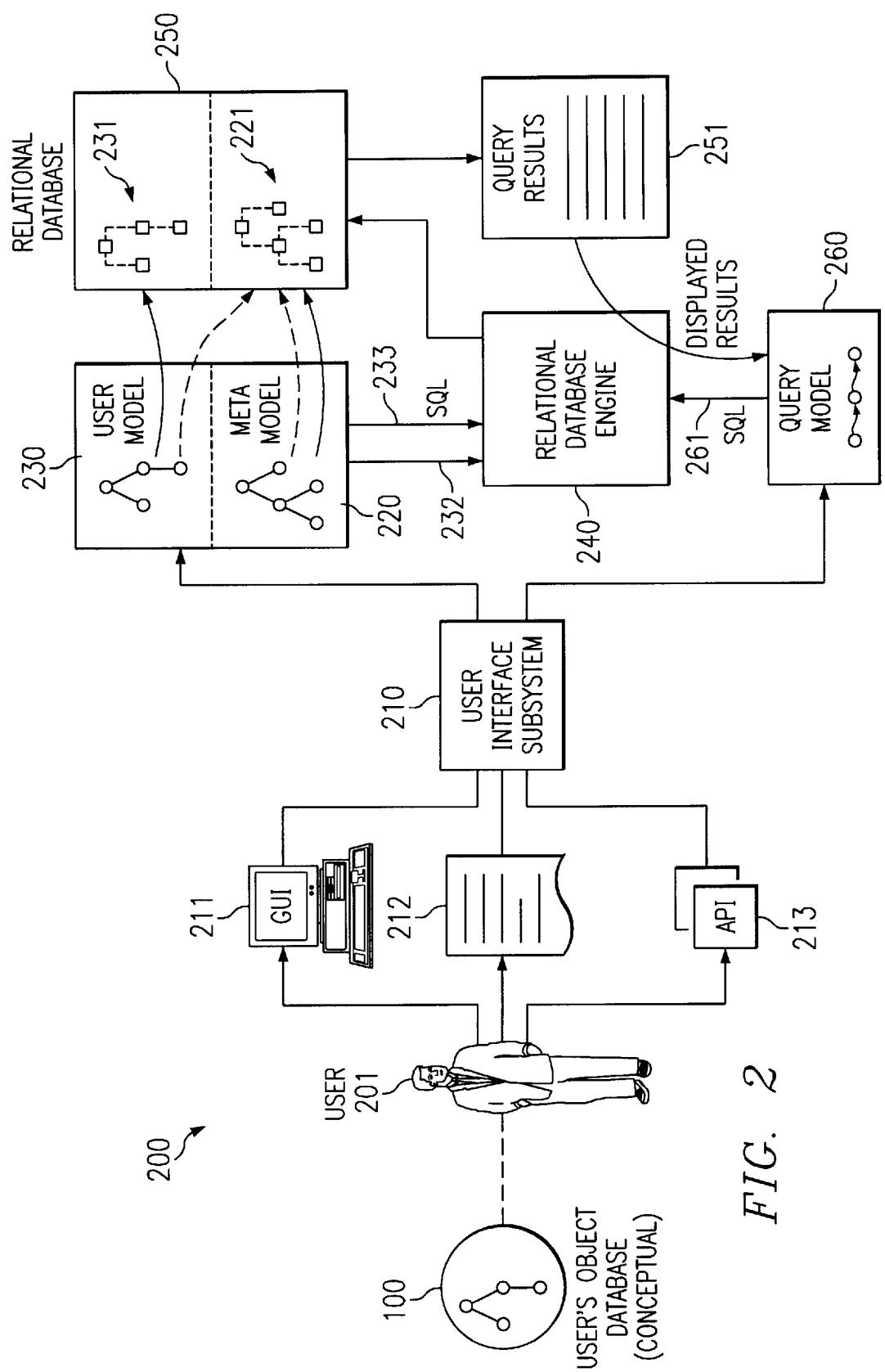
FIG. 2 shows a block diagram of a system for modeling of object-oriented database structures, translation to relational database structures, and dynamic searches thereon.

FIG. 2 shows a block diagram of a system for modeling of object-oriented database structures and translation to relational database structures.

A system 200, for modeling of object-oriented database structures and translation to relational database structures, comprises a user interface 210 for receiving commands and descriptions from a user 201. As shown herein, the commands and descriptions supplied by the user 201 include descriptive information about the user's object database 100. The system 200 receives the descriptive information about the user's object database 100 and stores that information in a meta-model 220 to represent a user database model 230. The meta-model 220 and the user database model 230 are themselves represented by structures in a relational database 250; the relational database 250 is implemented using a relational database engine 240.

In a preferred embodiment, the user interface 210 comprises a graphical user interface 211 ("GUI"), having editing tools for creating and editing the user database model 230. Graphical user interfaces are known in the art, and those skilled in the art would recognize, after perusal of this application, that modification of a known computer system to implement the functions required of the GUI 211 would be straightforward, and would not require either invention or undue experimentation.

In a preferred embodiment, the user interface 210 also comprises alternative tools for entering the descriptive information about the user's object database 100. These alternative tools include a text description tool 212, having a text format for recording the descriptive information, and disposed for reading that text format from a file or other software objects. Preferably, the text format is compatible with those written by other programs, such as other database programs, to facilitate easy and rapid transcription of data to the system 200 from other sources.

These alternative tools also include an application programming interface 213 ("API") for supplying commands and descriptions of the user's object database 100 to the system 200, having a set of programming constructs for providing an interface between a program invoked by the user 201, and disposed for receiving program calls and data to use for creating and editing the user database model 220. Preferably, the API 213 has similar descriptive and imperative power as the GUI 211, so that users 201 may invoke alternative programs for performing the same functions as the GUI 211.

Figure 6:
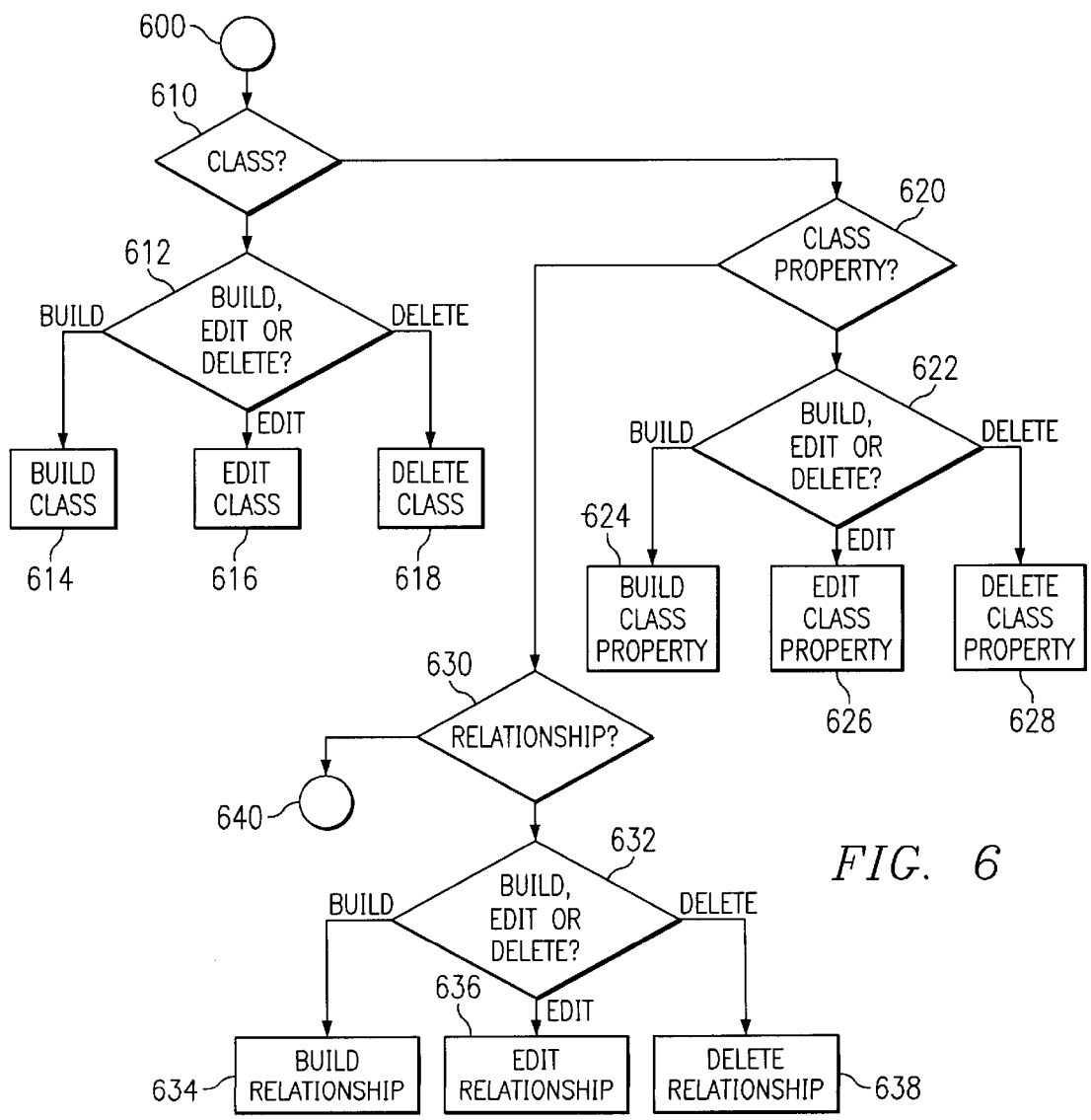
FIG. 6 shows a flow diagram of a process for building and editing a data model of the user's object database.

The functions provided by the GUI 211, the text description tool 212, and the API 213 are further described with regard to FIG. 6.

The meta-model 220 comprises an object database having as its objects the classes 101 in the user's object database 100, searchable properties 102 of those classes, and relationships 103 between those classes. The meta-model 220 is further described with regard to FIG. 3.

In a preferred embodiment, the relational database engine 240 comprises a standard relational database management tool, such as the "Oracle" product available from Oracle Corporation of Redwood Shores, Calif. In alternative embodiments, the relational database engine 240 may comprise a product which accepts relational database commands in the "SQL" database manipulation language, or another database manipulation language having similar descriptive and imperative power.

In a preferred embodiment, the relational database engine 240 comprises a client/server, multi-user, networked architecture which uses a multi-user relational database engine, so that (1) a plurality of users 201 may operate on the relational database 250 simultaneously, (2) requests may be processed by the relational database engine 240, from users 201 and from the system 200, in an interleaved manner, and (3) a plurality of users 201 and a plurality of copies of the system 200 may be distributed over a network coupled to a plurality of relational database engines 240.

Building the User Database

The user interface 210 receives commands and descriptions from the user 201 regarding the user's object database 100, and in response thereto, builds and edits the user database model 230. As the user database model 230 comprises a set of objects in the meta-model 220, the process of building and editing the user database model 230 simply comprises building and editing objects in the meta-model 220. These objects are maintained by the system 200 as persistent objects, so the user database model 230 is maintained as a persistent part of the meta-model 220 by the system 200.

The meta-model 220 itself is represented by a meta-model relational database 221, comprising a set of relational database tables, properties of those tables, columns within those tables, primary and secondary keys of those tables, and other defining features of the meta-model relational database 221. The user database model 230 is represented by objects in the meta-model relational database 221, comprising rows within those tables, specific values entered in the columns for those rows, and pointers from a row of one table to a row of a related table. The process of building and editing the user database model 230, i.e., building and editing objects in the meta-model 220, simply comprises building and editing classes 101, objects, searchable properties 102 and relationships 103 between classes 101, represented by rows, values and pointers in the meta-model relational database 221 which represent the descriptive information about the user's object database 100.

Since the meta-model 220 is also represented by the meta-model relational database 221, a set of objects in the meta-model relational database 221 represent the meta-model 220 itself. These objects in the meta-model relational database 221 representing the meta-model 220 may be edited just like the objects which represent the user database model 230. In fact, the user database model 230 may be built and edited simply by editing the objects in the meta-model 220. Even the structure of the meta-model 220 may also be edited by editing the objects in the meta-model 220.

In response to a triggering event, the system 200 translates the user model 230 into a user relational database 231, using a set of SQL commands 232 for specifying and creating relational structures in the user relational database 231. These SQL commands 232 specify relational database tables, properties of those tables, columns within those tables, primary and secondary keys of those tables, and other defining features of the user relational database 231. These SQL commands 232 are transmitted to the relational database engine 240, which then specifies and creates the user relational database 231.

In a preferred embodiment, the triggering event for translation of the user database model 230 comprises a command by the user 201 to the GUI 211, or by a program invoked by the user 201 to the API 213, to create the user relational database 231. However, alternative triggering events, such as a timed automatic save, or a sufficient change in the user database model 230, are also recognized by the system 200. When the user database model 230 is specified using the text description tool 212, the triggering event may comprise a triggering command in a text file itself, an end of file condition, such as having no more text to translate, or another condition.

Figure 7:
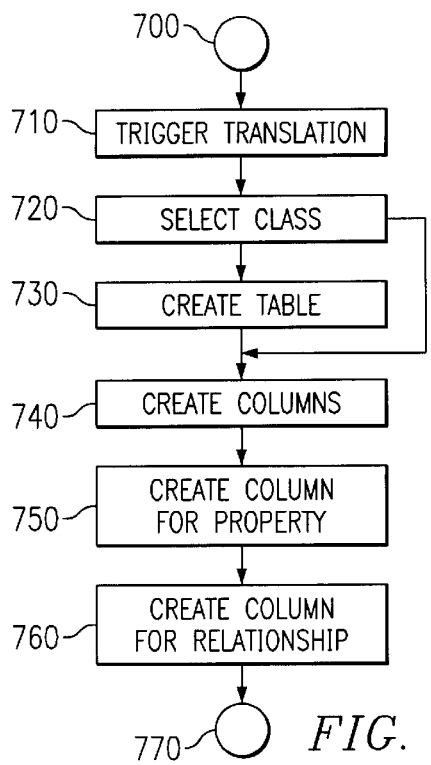
FIG. 7 shows a flow diagram of a process for translation between object-oriented and relational database structures.

The process for translation between object-oriented and relational database structures is further described with regard to FIG. 7.

Populating the User Database

The user interface 210 also receives commands and descriptions from the user 201 regarding populating objects for the user database model 230, corresponding to objects for the user's object database 100. In response thereto, the system 200 builds and edits data items for the user relational database 232, following the specifications in the user database model 230.

The system 200 translates the objects for the user database model 230 into a set of SQL commands 233 for inserting, modifying, or deleting rows in the tables of the user relational database 231. These SQL commands 233 are transmitted to the relational database engine 240, which creates and edits rows within those tables, specific values for the columns for those rows, and pointers from one table to a related table.

In a preferred embodiment, the user 201 may specify integrity checks for each class 101 in the user database model 230, such that when an object is added to the user relational database 231, the integrity check is performed and the object is assured to meet the integrity check. For example, in the example user's object database 100 shown in FIG. 1, the user 201 may specify that each object of class 101 component has one and only one associated object of class 101 manufacturer. In this example, the user 201 may specify this integrity check in the data-model relationship 103 between the class 101 component and the class 101 manufacturer.

Similarly, the user 201 may specify a set of enumerated values, or a range of values, as the only valid values for a searchable property 102. When the user 201 so specifies, the system 200 creates an object, as further described herein with reference to FIG. 3, describing the valid set of enumerated values or the valid range of values, and associates that object with the searchable property 102.

In a preferred embodiment, the user interface 210 provides the user 201 with a command to show the valid set of enumerated values or the valid range of values for a searchable property 102, before entering a value for that searchable property 102 for a particular object. This allows the user 201 to determine which values are appropriate for that searchable property 102 before populating an object with a new value. When the user 201 has already entered values for other searchable properties 102 of the object, the user interface 210 optionally specifies only those values already in the database for objects having the same values for those other searchable properties 102. For example, in the example user's object database 100 shown in FIG. 1, if the user 201 is creating an object of class 101 memory, has already entered a value for the searchable property 102 "name" for the associated object of class 101 manufacturer, and is about to enter the value for the searchable property 102 "size", the user 201 may request the user interface 210 to display all the values for "size" which already exist for memories with that manufacturer.

In addition to integrity checking, the user 201 may specify "business rules," i.e., extension functions to be executed when an object of a specified class 101 is created or destroyed. For example, the user 201 may specify a searchable property "Serial Number" for objects of class 101 component, with the business rule that the system 200 creates a unique new serial number whenever a new object of that class 101 is created. Extension functions for classes 101 (class functions) and for searchable properties 102 (class property functions) are further described herein with reference to FIG. 3.

Querying the User Database

The user interface 210 also receives commands and descriptions from the user 201 regarding querying or searching the user's object database 100 (i.e., for querying or searching the objects in the user relational database 231). In response thereto, the system 200 builds and edits a query model 260 for a query to be applied to the user relational database 231. The process of building and editing the query model 260 is further described herein with regard to FIG. 9.

In response to a triggering event, the system 200 translates the query model 260 into a set of SQL commands 261 for querying (including SQL query features such as grouping and sorting) the user relational database 231. These SQL commands 261 are transmitted to the relational database engine 240, which applies the query to the user relational database 231, generates a set of query results 251 from the query, and returns that set of query results 251 for presentation to the user 201.

In a preferred embodiment, the triggering event for translation of the query model 260 comprises a command by the user 201 to the GUI 211, by a text command to the text description tool 212, or by a program invoked by the user 201 to the API 213, to create the query results 251. The query model 260 also comprises descriptive information regarding presenting the results of the query to the user 201, which is incorporated by the system 200 into the SQL commands 261 for the query.

Figure 9:
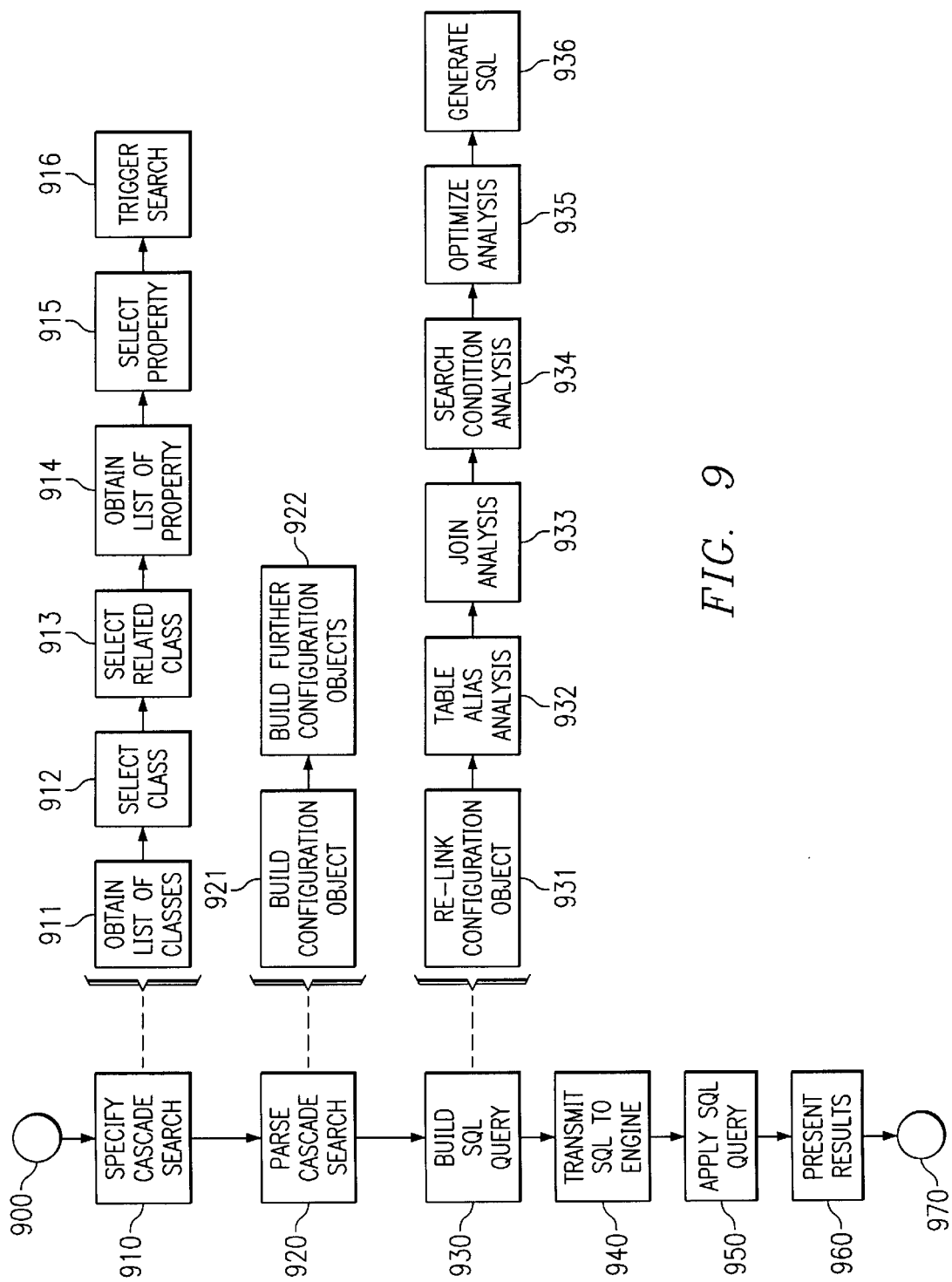
FIG. 9 shows a flow diagram of a process for cascade searching of an object database and search translation between object-oriented and relational database structures.
Figure 10:
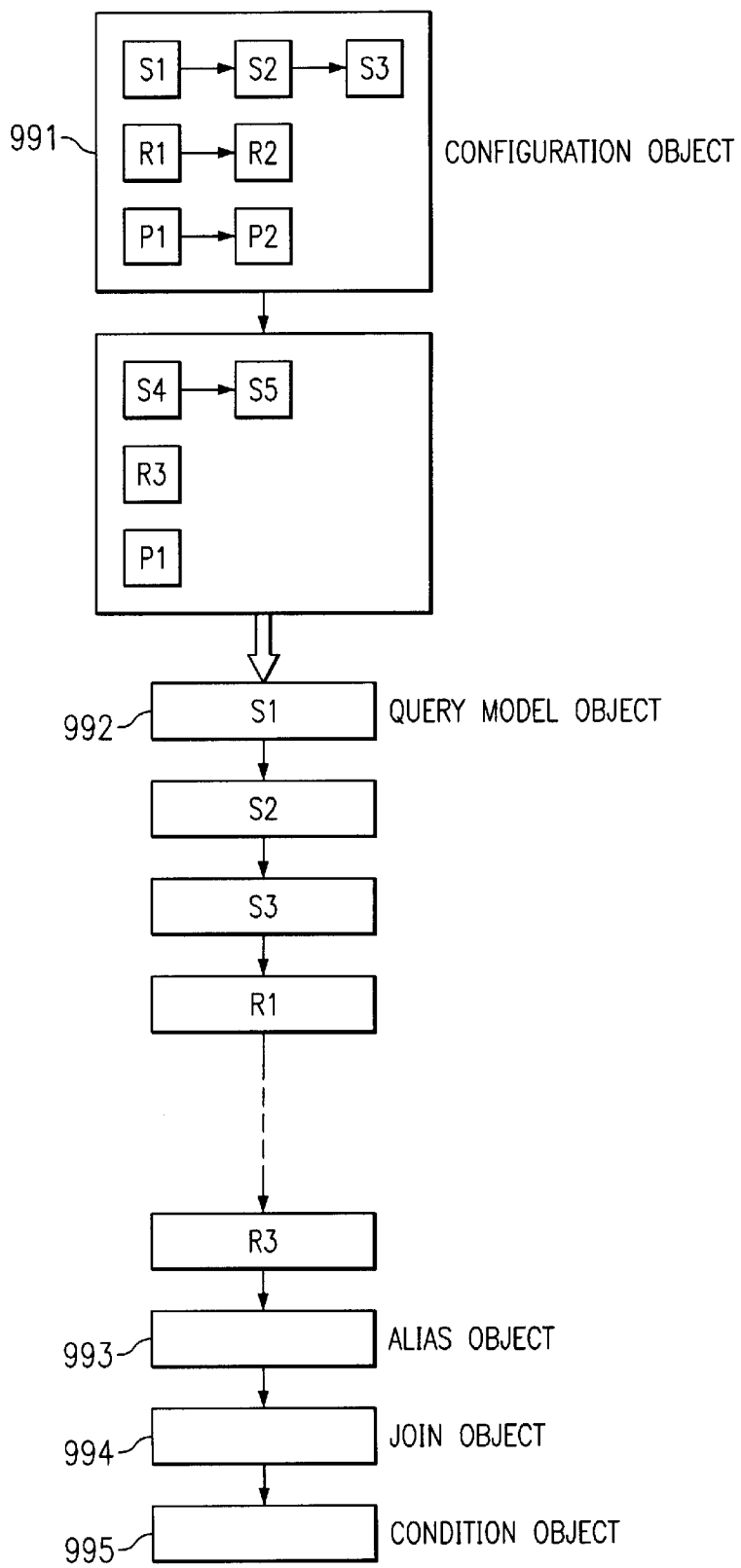
FIG. 10 shows a block diagram of data structures used in the process for cascade searching.

The process for creation of the query model 260 and translation of the query model 260 into a relational database query is further described with regard to FIG. 9.

Meta-Model for Modeling the User's Object Database

Figure 3:
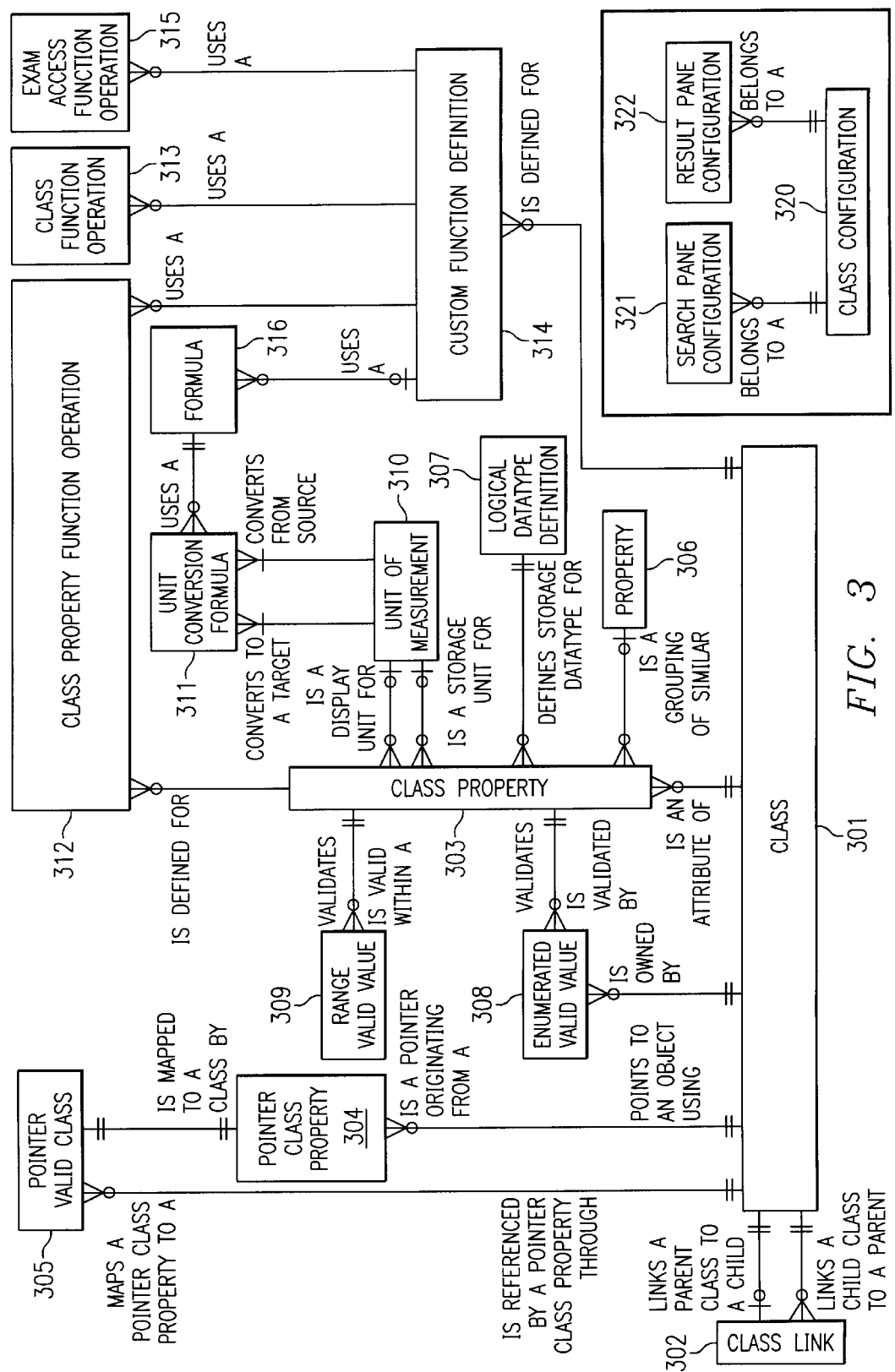
FIG. 3 shows a data model diagram of a meta-model for modeling the user's object database.

FIG. 3 shows a data model diagram of a meta-model for modeling the user's object database.

The meta-model 220 comprises a set of classes 101, a set of searchable properties 102 for each class 101, and a set of relationships 103 between classes 101, thus forming a system object database for recording information about the user's object database 100.

In FIG. 3, each box represents a class 101 and each line between boxes represents a relationship 103 between classes 101.

At junctions between classes 101 and relationships 103, symbols represent whether the relationship 103 couples zero, one, or more than one, objects of that class 101. A symbol has two symbol parts; a circular symbol part indicates zero objects, a single line symbol part indicates one object, and a forked line symbol part indicates more than one object. Thus a single symbol may indicate, for example, that each object in a first class 101 corresponds to one or more objects in a second class 101.

A shaded box represents a cross-link class 101, whose purpose is to provide for a many-to-many relationship between objects. Each such class 101 has two or more relationships 103, at least a first many-to-one relationship 103 to a first class 101 and a second many-to-one relationship 103 to a second class 101. Thus, each object in a cross-link class 101 comprises at least an ordered pair of elements, one object from the first class 101 and one object from the second class 101, and represents a one-to-one relationship 103 between those two objects.

Meta-Model Classes

In a preferred embodiment, the meta-model 220 comprises classes shown in table 3-1.

TABLE 3-1

| Class | Description of Object in Class |
| --- | --- |
| Class | class modeled by the meta-model |
| Class Link | cross-link class between parent/child classes |
| Pointer Class Property | searchable property modeled by a pointer to another class, having a delete, insert, and update rules associated with the pointer |
| Pointer Valid Class | relationship between pointing object and object of target class |
| Class Property | searchable property modeled by the meta-model, having built-in type of value |
| Property Group | related group of properties |
| Logical Datatype Definition | logical data type for property |
| Enumerated Valid Value | set of enumerated valid values for property |
| Range Valid Value | range of valid values for property |
| Unit of Measurement | unit of measurement for property |
| Unit Conversion Formula | formula for converting between source and target unit of measurement |
| Class Property Function Operation | member function defined for a class property |
| Class Function Operation | member function defined for a class |
| Custom Function Definition | user-specified function |
| External Access Function Operation | function which calls on the operating system |

TABLE 3-1-continued

| Class | Description of Object in Class |
| --- | --- |
| Formula | algebraic formula |
| Configuration | description of how an object is displayed, such as a configuration for editing an object |
| Search Panel Configuration | configuration for a search |
| Results Panel Configuration | configuration for displaying search results |

The user's object database 100 comprises a set of classes 101. In the meta-model 220, each class of the user's object database 100 is modeled by an object of class Class 301.

In a preferred embodiment, each object of class Class 301 comprises information in table 3-2.

TABLE 3-2

| Property | Description |
| --- | --- |
| Object ID | unique ID for this object |
| Class Label | name to be displayed for the class |
| Class DB Name | unique name for the class to be used in the user relational database |
| Class Group | indicates whether the class is part of the meta-model, a predefined class provided by the system, such as for graphics or permissions, or a user class |
| Class Type | indicates whether the class is part of the meta-model, a cross-link class, a base class created for the sole purpose of grouping derived classes under a single "folder" name, or any other class created by the user |
| Is System Specific | TRUE if this class is part of the system |
| Number of Objects | number of objects currently in this class |
| Number of DB Blocks | number of database blocks currently used by this class |
| Max # of Objects | maximum number of objects expected for the class |
| Class Description | description of the class, for user convenience |
| Pending Operation | indicates the next operation pending for the class, e.g., create relational table, modify relational table, recreate relational table, or no action pending |
| Action | indicates an action being taken for this class, e.g., executing the "Pending Operation", altering display configuration, refreshing an Oracle "view", counting the number of objects in the class, or no action being taken |

The property 102 "Class DB Name" is generated by the system 200, and is preferably required to satisfy name restrictions imposed by the relational database engine 240, such as being limited to a certain length or to having only certain characters. The "Class DB Name" is used by the system 200 for generating SQL commands for accessing relational structures corresponding to this class 101, such as the SQL commands 232, 233, and 261. In a preferred embodiment, the user 201 may override the "Class DB Name" generated by the system 200, but must still satisfy the name restrictions imposed by the relational database engine 240.

The properties 102 "Class Group", "Class Type", and "Is System Specific" maintain information about the purpose of the class 101 in the system 200. If the user 201 modifies a class 101 which is critical to operation of the system 200, such as a class 101 which is part of the meta-model 220, the system 200 warns the user 201 and requests confirmation that the action is truly intended.

The property 102 "Max # of Objects" is provided by the user 201, although this property 102 does not impose a hard limit of any kind, and is just a suggestion by the user 201, and the system 200 preferably provides a default value and a procedure for extension when the number of objects exceeds this property value. The properties 102 "Number of Objects" and "Number of DB Blocks" are provided by the system 200. These properties 102 are used for improving the system's efficiency in creating or searching tables using the relational database engine 220, as shown herein with reference to FIG. 9.

The properties 102 "Pending Operation" and "Action" maintain information about the status of the class 101 with regard to its representation in the relational database 250. If there is more than one user 201 simultaneously using the system 200 (this is the preferable operation of the system 200), it may occur that more than one user 201 attempts to simultaneously modify the same class 101. The system 200 uses these properties 102 to assure that such attempts do not cause any class 101 to enter an inconsistent state. Those skilled in the art of database systems will recognize that there are many known techniques for maintaining database integrity despite simultaneous updates of a database system, and will recognize, after perusal of this application, that application of such techniques to the system 200 would not require either invention or undue experimentation.

Parent/Child Classes

In the user's object database 100, each class comprises zero or more parent classes (base classes from which that class is derived), and zero or more child classes (derived classes for which that class is a base class). In the meta-model 220, each object of class Class 301 may have zero or more parent objects of class Class 301, and may have zero or more child objects of class Class 301. These many-to-many parent/child class relationships 103 are represented using a cross-link class Class Link 302.

Each object in the class Class Link 302 links a child class 101 to a parent class 101. A child class 101 may have more than one parent class 101 due to multiple inheritance.

In a preferred embodiment, each object of class Class Link 302 comprises information in table 3-3.

TABLE 3-3

| Property | Description |
| --- | --- |
| Object ID | unique ID for this object |
| Parent Class | object ID for parent class |
| Child Class | object ID for child class |
| Distributed DB Node | node in a distributed database for which this object is a link |

The searchable property 102 "Distributed DB Node" identifies a node in a distributed database. When an object of class Class Link 302 has a link to another node in a distributed database, the searchable property 102 "Distributed DB Node" for that object is set to identify the other node, and the system 200 responds to that link by attempting to spawn a related process at the linked-to node. Thus, the user 201 can perform relational database JOIN operations, and cascade searches, across multiple nodes of a distributed relational database 250.

When the user 201 creates a derived class 101, or alters the base/derived status of a class 101, the system 200 creates or edits an object of class Class Link 302 to model the base/derived relationship.

Searchable Properties

The user's object database 100 comprises a set of searchable properties for each class. Searchable properties may comprise data values which are "built-in" data types, such as integers and floating-point numbers, or may comprise data values which are themselves user-defined data types, represented as objects in user-defined classes. In the meta-model 220, searchable properties comprising built-in data types are represented by a class Class Property 303, while searchable properties comprising user-defined data types (implemented by pointers to objects of the user-defined data types) are represented by a class 101 Pointer Class Property 304.

The class Class 301 has a relationship 103 to the class Pointer Class Property 304 which links a class 101 to its searchable properties with user-defined data types. The class Pointer Class Property 304 has a relationship 103 to the class Pointer Valid Class 305, and the class Pointer Valid Class 305 has a relationship 103 to the class Class 301, which link a searchable property 102 with a user-defined data type to the class 101 defining that data type.

Searchable Properties: User-Defined Datatypes

The class Pointer Class Property 304 includes one object for each searchable property 102 for any object of class Class 301 having a user-defined data type, and each object of class Class 301 may have zero or more associated objects of class Pointer Class Property 304. Each object of class Pointer Class Property 304 has a pointer to an object of the user-defined type; the pointer is an object of class Pointer Valid Class 305.

In a preferred embodiment, each object of class Pointer Class Property 304 comprises information in table 3-4

TABLE 3-4

| Property | Description |
| --- | --- |
| Object ID | unique ID for this object |
| Pointer Property Label | name to be displayed for the property |
| Pointer Property DB Name | unique name for the property to be used in the user relational database |
| Display Order | order this property is displayed relative to others within its class |
| Is Owned by Target | TRUE if this property inherits permission from the class it points to |
| Is Value Required | TRUE if value cannot be null |
| Is Column Indexed | TRUE if column for this property is indexed in the user relational database |
| Column Index Type | type of index in the relational database |
| Is Derived Externally | TRUE if generated by system |
| Relational Meaning | relational meaning of property in the user relational database, e.g., primary key, internal key, description |
| Configuration Info | indicates when this property is displayed: for searches, for search results, for both, or for neither |
| Insert Update Rule | rule to follow when inserting or updating new objects having this property, e.g., disallow updates if there are related objects, cascade update to any related objects, or set pointer to null on update of related objects |
| Delete Rule | rule to follow when deleting objects having this property, e.g., disallow deletion if there are related objects, cascade deletion to any related objects, set pointer to null on deletion of related objects, or set pointer to default value on deletion of related objects |
| Pending Operation | indicates the next operation pending for the property, e.g., alter relational database dictionary, or no action pending |
| Number of DB Blocks | number of database blocks used by the relational column for this property |
| Row Selectivity | measure of distribution of values in the relational column for this property |
| Block Selectivity | measure of distribution of values, at DB block level |
| Pointer Description | description of the property, for user convenience |

Similar to the property 102 "Class DB Name", the property 102 "Pointer Property DB Name" is generated by the system 200, and is preferably required to satisfy name restrictions imposed by the relational database engine 240, such as being limited to a certain length or to having only certain characters. The "Pointer Property Class DB Name" is used by the system 200 for generating SQL commands for accessing relational structures corresponding to this property 102, such as the ESQL commands 232, 233, and 261. In a preferred embodiment, the user 201 may override the "Pointer Property DB Name" generated by the system 200, but must still satisfy the name restrictions imposed by the relational database engine 240.

The properties 102 "Display Order" and "Configuration Info" are merely default values for the property 102, and may be overridden by the user 201 for specific display configurations or searches.

The properties 102 "Number of DB Blocks", "Row Selectivity" and "Block Selectivity" are computed by the system 200. These properties 102 are used for improving the system's efficiency in searching tables using the relational database engine 220.

In a preferred embodiment, each object of class Pointer Valid Class 305 includes information in table 3-5.

TABLE 3-5

| Property | Description |
| --- | --- |
| Object ID | unique ID for this object |
| Valid Class Description | description of the relation between the pointing and target classes, e.g., in "part is-manufactured-by manufacturer", the Valid Class Description would be 'is-manufactured-by' |

Each object of class Pointer Valid Class 305 links an object of class Pointer Class Property 304 to a target class 101.

Searchable Properties: Built-In Datatypes

The class Class Property 303 includes one object for each searchable property 102 for any object of type class having a built-in data type, and each object of class Class 301 may have zero or more associated objects of class Class Property 303. Each object of class Class Property 303 has a value.

In a preferred embodiment, each object of class Class Property 303 comprises information in table 3-6

TABLE 3-6

| Property | Description |
| --- | --- |
| Object ID | unique ID for this object |
| Property Label | name to be displayed for the property |
| Property Data Type | indicates data type this property is stored as: boolean, character, date, integer, monetary, numeric, or timestamp |
| Property DB Name | unique name for the property to be used in the user relational database |
| Display Order | order this property is displayed relative to others within its class |
| Display Type | indicates data type this property is displayed as: boolean, character, date, integer, monetary, numeric, or timestamp |
| Display Length | space allocated to displaying this property |
| Display Precision | number of digits for displaying this property |
| Case Style | for text values only, either always lower case, always upper case, case insensitive, or case sensitive |
| Visible Rows | number of rows for displaying this property |

TABLE 3-6-continued

| Property | Description |
| --- | --- |
| Relational Meaning | relational meaning of property in the user relational database, e.g., primary key, internal key, description |
| Configuration Info | indicates when this property is displayed: for searches, for search results, for both, or for neither |
| Default Value | value when not specified by the user |
| Is Value Required | TRUE if value cannot be null |
| Is Column Indexed | TRUE if column for this property is indexed in the user relational database |
| Column Index Type | type of index in the relational database |
| Valid Value Type | indicates if value is restricted to certain valid values, e.g., enumerated valid value or range valid value |
| Is Derived Externally | TRUE if generated by system |
| Is Comma Displayed | for numeric values only, TRUE if a comma is displayed to separate thousands |
| Is Scientific Notation | for numeric values only, TRUE if displayed in scientific notation |
| Pending Operation | indicates the next operation pending for the property, e.g., alter relational database dictionary, or no action pending |
| Number of DB Blocks | number of database blocks used by the relational column for this property |
| Row Selectivity | measure of distribution of values in the relational column for this property |
| Block Selectivity | measure of distribution of values, at DB block level |
| Property Description | description of the property, for user convenience |

Similar to the property 102 "Class DB Name", the property 102 "Property DB Name" is generated by the system 200, and is preferably required to satisfy name restrictions imposed by the relational database engine 240, such as being limited to a certain length or to having only certain characters. The "Property Class DB Name" is used by the system 200 for generating SQL commands for accessing relational structures corresponding to this property 102, such as the SQL commands 232, 233, and 261. In a preferred embodiment, the user 201 may override the "Property DB Name" generated by the system 200, but must still satisfy the name restrictions imposed by the relational database engine 240.

The properties 102 "Display Order", "Display Type", "Display Length", "Display Precision", "Visible Rows" and "Configuration Info" are merely default values for the property 102, and may be overridden by the user 201 for specific display configurations or searches.

The properties 102 "Number of DB Blocks", "Row Selectivity" and "Block Selectivity" are computed by the system 200. These properties 102 are used for improving the system's efficiency in searching tables using the relational database engine 220.

A class Property Group 306 includes one object for each type of searchable property 102, and each object of class Class Property 303 may have zero or more associated objects of class 101 Property Group 306. Each object of class Property Group 306 has a group name. The class Class Property 303 has a relationship 103 to the class Property Group 306 which links a group of properties into a single folder class 101.

Searchable Property Data Values

In the user's object database 100, a searchable property 102 of the class Class Property 306 may have a specific logical data type, such as integer or floating point. In the meta-model 220, a class Logical Datatype Definition 307 includes one object for each logical data type, and each object of class Class Property 303 is associated with no more than one object of class Logical Datatype Definition 307.

In a preferred embodiment, each object of class Logical Datatype Definition 307 comprises information in table 3-7.

TABLE 3-7

| Property | Description |
| --- | --- |
| Object ID | unique ID for this object |
| Logical Datatype Name | name to be displayed for the data type |
| DBMS Data Type | name of data type as defined by relational database engine |
| DBMS Data Type Length | length of data type as defined by relational database engine |
| Data Storage Precision | maximum number of digits to right of decimal point |
| Datatype Description | description of the data type, for user convenience |

In the user's object database 100, a searchable property 102 of the class Class Property 303 may have its value restricted to a specific range or to a specific set of enumerated values. In the meta-model 220, a class Enumerated Valid Value 308 includes one object for each set of enumerated valid values, and each object of class Class Property 303 is associated with zero or more objects of class Enumerated Valid Value 308. Similarly, a class Range Valid Value 309 includes one object for each set of range valid values, and each object of class Class Property 303 is associated with zero or more objects of class Range Valid Value 309.

In a preferred embodiment, each object of class Enumerated Valid Value 308 comprises information in table 3-8.

TABLE 3-8

| Property | Description |
| --- | --- |
| Object ID | unique ID for this object |
| Enumerated Value | valid lookup value |
| Valid Value Name | name for valid lookup value |
| Cascade Flag | TRUE if valid lookup value is cascaded to derived classes |

The property 102 "Cascade Flag" describes whether, when the object of class Enumerated Valid Value 308 is associated with a property 102 for a base class 101, whether the enumerated valid values are cascaded to the same property 102 for objects of derived classes 101 which are derived from that base class 101. For example, in the example user's object database 100 shown in FIG. 1, the user 201 may specify a searchable property 102 "Serial Number" for the class 101 component, and may specify a set of enumerated valid values for the class 101 component. Although this searchable property 102 "Serial Number" is inherited by each derived class 101 of the base class 101 component, such as the class analog component and the class 101 memory, the user 201 may desire that these derived classes 101 have distinct sets of enumerated values for their own serial numbers.

The class Enumerated Valid Value 308 has a first relationship 103 with the class Class 301 and has a second relationship 103 with the class Class Property 303.

In a preferred embodiment, each object of class Range Valid Value 309 comprises information in table 3-9.

TABLE 3-9

| Property | Description |
| --- | --- |
| Object ID | unique ID for this object |
| Minimum Value | minimum valid value |
| Maximum Value | maximum valid value |

TABLE 3-9-continued

| Property | Description |
| --- | --- |
| Default Value | default value if none specified |
| Cascade Flag | TRUE if valid lookup value is cascaded to derived classes |

Similar to the property 102 "Cascade Flag" for the class Enumerated Valid Value 308, the property 102 "Cascade Flag" describes whether, when the object of class Range Valid Value 309 is associated with a property 102 for a base class 101, whether the range of valid values are cascaded to the same property 102 for objects of derived classes 101 which are derived from that base class 101. For example, in the example user's object database 100 shown in FIG. 1, the user 201 may specify a searchable property 102 "Serial Number" for the class 101 component, and may specify a range of valid values for the class 101 component. Although this searchable property 102 "Serial Number" is inherited by each derived class 101 of the base class 101 component, such as the class analog component and the class 101 memory, the user 201 may desire that these derived classes 101 have distinct ranges of values for their own serial numbers.

The class Range Valid Value 309 has a first relationship 103 with the class Class 301 and has a second relationship 103 with the class Class Property 303.

Units of Measurement

In the user's object database 1001 a searchable property 102 of the class Class Property 303 may have its value expressed in a designated unit of measurement. In the meta-model 220, a class Unit of Measurement 310 includes one object for each unit of measurement, and each object of class Class Property 303 is associated (for display) with at most one objects of class Unit of Measurement 310, and is also associated (for storage) with at most one objects of class Unit of Measurement 310.

In a preferred embodiment, each object of class Unit of Measurement 310 comprises information in table 3-10.

TABLE 3-10

| Property | Description |
| --- | --- |
| Object ID | unique ID for this object |
| UOM Name | name of the unit of measurement |
| UOM Display Symbol | symbol to be displayed for the unit of measurement, e.g., "mg" |
| UOM Description | description of the unit of measurement, for user convenience |

In the user's object database 100, a first unit of measurement may be converted to a second unit of measurement. For example, to convert volts to millivolts, multiply by 1,000. In the meta-model 220, a class Unit Conversion Formula 311 includes one object for each formula for converting units of measurement, and each object of class Unit Conversion Formula 311 is associated (for source units) with zero or more objects of class Unit of Measurement 310, and is also associated (for target units) with zero or more objects of class Unit of Measurement 310.

Custom Functions

Custom functions provide a technique for dynamic modification of objects in the system 200, including objects in the meta-model 220. Those custom functions are triggered by insertion events, modification events, and deletion events. The user 201 specifies the actual changes performed by the system 200 when custom functions are invoked.

The meta-model 220 comprises several additional classes 101 embodying objects for computation, class Class Property Function Operation 312, class Class Function Operation 313, class Custom Function Definition 314, class External Access Function Operation 315, and class Formula 316.

The class Unit Conversion Formula 311 has a first relationship 103 with the class Unit of Measurement 310 for a source unit of measurement, a second relationship 103 with the class Unit of Measurement 310 for a target unit of measurement, and a relationship 103 with the class Formula 316 for the conversion formula.

An object of class Formula 316 comprises an algebraic formula, and includes a formula name, an addend, a multiplier, an add/multiply rule (add, multiply, add then multiply, or multiply then add), and a formula description.

Objects of class Class Property Function Operation 312 and of class Class Function Operation 313 comprise information about functions to be performed in addition to, or in place of, an operation for the relational database 250, and includes an operation sequence (e.g., defined in terms of calls on the operating system), and a DBMS operation which the custom function adds to or substitutes for.

An object of class Custom Function Definition 314 comprises information about a custom function, and includes a function name, a version number, a function description, a flag to force execution of the custom function when an object of a class 101 related to the custom function is created, and a flag to override a custom function for a base class 101 when an object of a derived class 101 is created. A custom function adds or overrides a class member function, for a class 101 or an object in a class 101, and may be specified to override the class member function either before or after the class member function's ordinary operation.

An object of class External Access Function Operation 315 comprises information about a function for accessing an object which is external to the system 200, such as a file system object, an external database, or another object accessed by calls on the operating system.

Class Information Display

In a preferred embodiment, a class Class Configuration 320 includes one object for each description of a display configuration of a class 101 in the user's object database 100. Each object of class Class Configuration 320 is related to zero or more objects of class Search Pane Configuration 321, a class 101 including one object for each display configuration for searches on the class 101, and is related to zero or more objects of class Result Pane Configuration 322, a class 101 including one object for each display configuration for results of searches on the class 101.

In a preferred embodiment, each object of class Search Pane Configuration 321 and each object of class Result Pane Configuration 322 comprises information in table 3-11.

TABLE 3-11

| Property | Description |
| --- | --- |
| Object ID | unique ID for this object |
| Display Type | data type for display of the field |
| Display Width | maximum display width for the field |
| Display UOM | unit of measurement for display |
| Row Order | relative order for displaying row |
| Column Order | relative order for displaying column |
| Custom Label | label for displaying the field |

Each object of class Search Pane Configuration 321 and each object of class Result Pane Configuration 322 is also associated with zero or more objects of class Class 301 and with zero or more objects of class Class Property 303, to define the classes and class properties to be displayed.

Access Control

Figure 4:
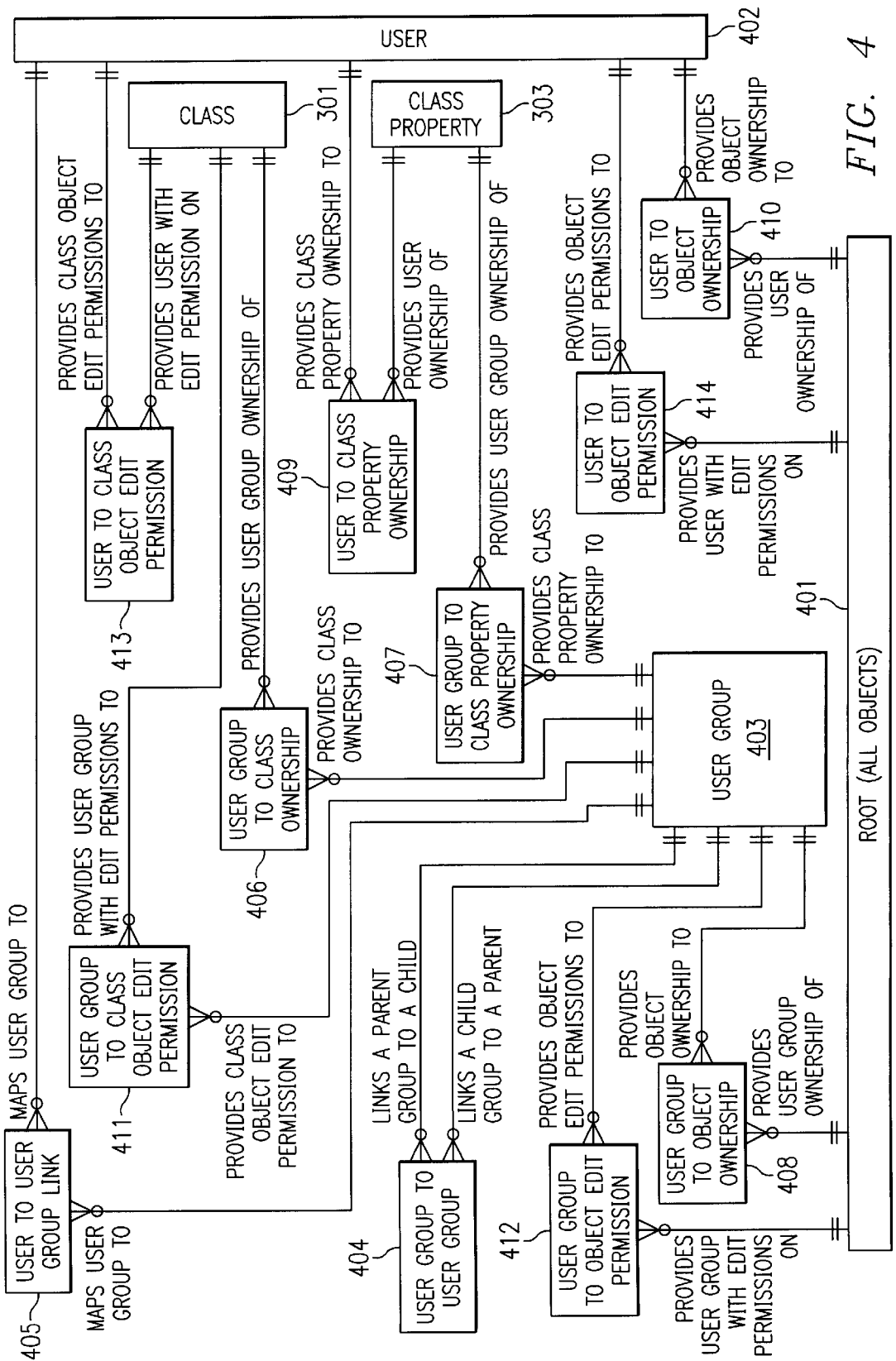
FIG. 4 shows a data model diagram of a set of classes for modeling access control for the user's object database.

FIG. 4 shows a data model diagram of a set of classes for modeling access control for the user's object database.

In a preferred embodiment, the set of classes shown in FIG. 4 are predefined for the system 200. However, unlike the meta-model 220, these classes 101 are provided for convenience in modeling access control, and are not strictly required for modeling, translation, or searching the user's object database 100.

A class Root 401 is a base class 101 for all classes 101. In a preferred embodiment, the class Root 401 has only a few searchable properties which are generic to all objects in the system 200, such as a signature of the last creator or last modifier of the object, a timestamp, an is-private flag for indicating whether the object is private to a particular user 201, and a template identifier, if the object is a member of a class template. The class Root 401 is provided so that relationships 103 with the class Root 401 are inherited by all classes 101.

An object of class User 402 represents an individual user of the system 200, and includes information about the user, such as a user name, user password (possibly encoded for security), "super user" status, mailing address, telephone number, and accounting information such as who is responsible for user charges.

An object of class User Group 403 represents a group of users of the system 200, all having similar access control rights. User groups form a parent/child hierarchy (more precisely, a directed acyclic graph) like the parent/child relationship of classes 101. The class User Group 403 has a many-to-many relationship with itself using the cross-link class User Group to User Group 404, which represents the user group parent/child hierarchy.

The class User 402 and the class User Group 403 have a many-to-many relationship using the cross-link class User to User Group Link 405, which represents zero or more users' membership in zero or more user groups.

Access control is provided by two features. The first feature is ownership of a class property or an individual object, which ownership is by a user group or a user. (A user group may also own an entire class.) The second feature is edit permissions for a class or an individual object, which edit permissions are by a user group or a user.

Ownership is represented by the cross-link class User Group to Class Ownership 406, the cross-link class User Group to Class Property Ownership 407, the cross-link class User Group to Object Ownership 408, the cross-link class User to Class Property Ownership 409, and the cross-link class User to Object Ownership 410. Ownership is thus a many-to-many relationship which links classes, class properties and objects with their user group and user owners.

Edit permissions are represented by the class User Group to Class Object Edit Permission 411, the class User Group to Object Edit Permissions 412, the class User to Class Object Edit Permission 413, and the class User to Object Edit Permission 414. Edit permissions are also a many-to-many relationship which links class properties and objects with user groups and users having permissions, except that for each such relationship the specific edit permissions are listed in an edit permissions object.

Graphical Information Display

Figure 5:
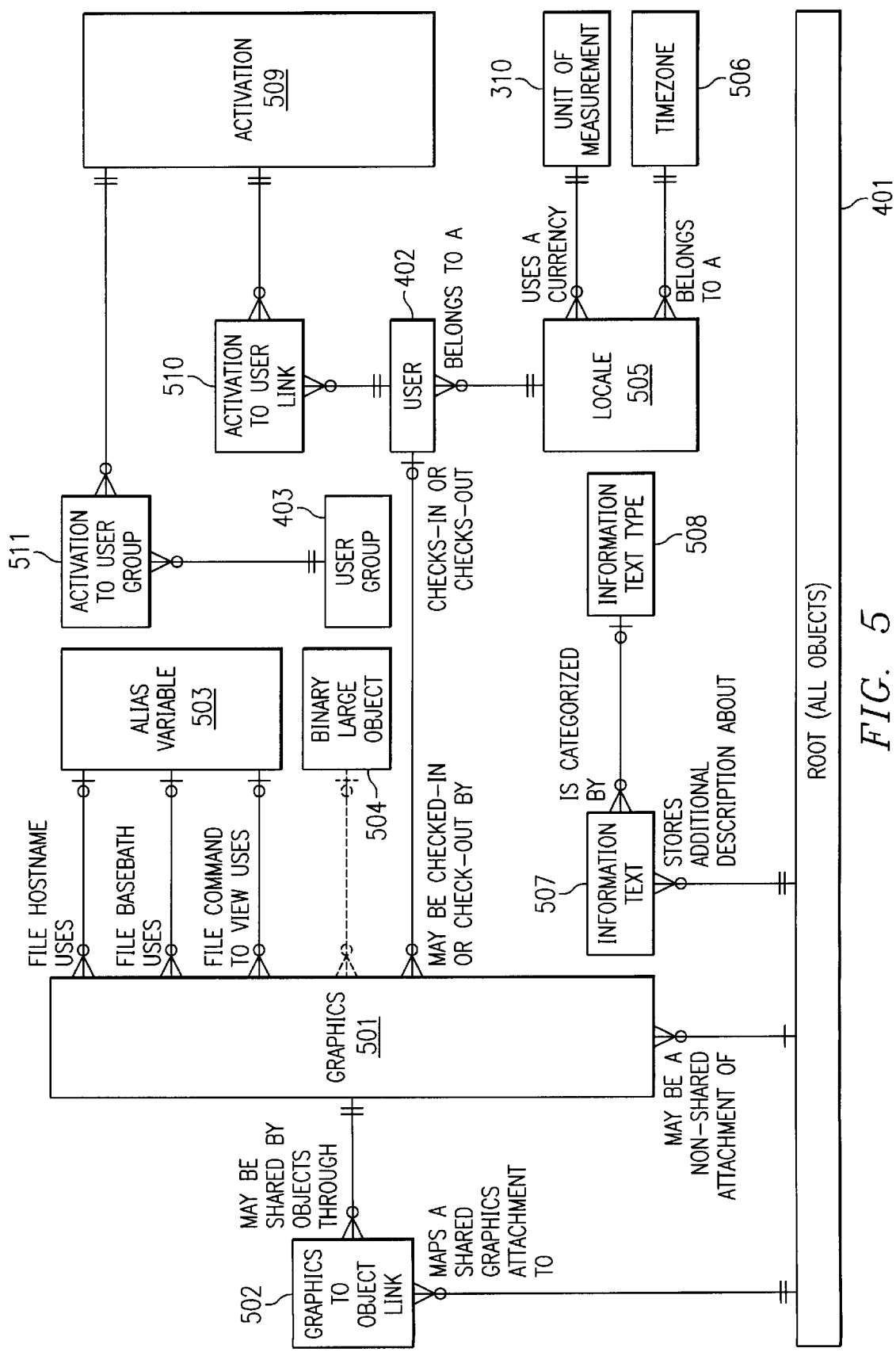
FIG. 5 shows a data model diagram of a set of classes for modeling predefined graphical information display for the user's object database.

FIG. 5 shows a data model diagram of a set of classes for modeling predefined graphical information display for the user's object database.

In a preferred embodiment, the set of classes shown in FIG. 5 are predefined for the system 200. However, unlike the meta-model 220, these classes 101 are provided for convenience in modeling predefined graphical information, and are not strictly required for modeling, translation, or searching the user's object database 100.

An object of class Graphics 501 comprises information about a predefined graphics object. The class Graphics 501 is related to the class Root 401 by a cross-link class Graphics to Object Link 502, defining a many-to-many relationship in which any object may be sharably attached to any graphics object, and any graphics object may be sharably attached to any object. The class Graphics 501 is also related to the class Root 401 by a many-to-one relationship 103, in which a graphics object may be a non-shared attachment of any object.

An object of class Alias Variable 503 comprises information about a file accessible using the operating system. The class Graphics 501 is related to the class Alias Variable 503 by several many-to-one relationships 103, one each for files used by the operating system to implement the graphics object. Similarly, an object of class Binary Large Object 504 comprises a binary large object implemented by the operating system, and is associated with zero or more graphics objects.

The class Graphics 501 is also related to the class User 402 by a many-to-one relationship 103, in which a graphics object may be "checked out" or "checked in" (as a library book) by a user. When a graphics object is "checked out," no other user 201 of the system 200 is allowed to access that graphics object until it is "checked in" again. This allows the user 201 to check out a graphics object, atomically update it, and check the graphics object back in, when it will again be available to other users 201.

An object of class Locale 505 comprises a logical location, such as a country. Zero or more locations may be related to a currency, represented by an object of class Unit of Measurement 310, and to an object of class Timezone 506. An object of class Locale 505 includes a language identifier, a currency symbol and its placement, numeric formats (e.g., a digit separator, a date format, a time format, a radix point), and words for "false" and "true". Zero or more users may be associated with a single locale.

An object of class Information Text 507 comprises textual information about any object. The class Information Text 507 is related to the class Root 401 by a many-to-one relationship 103, in which textual information may be attached to any object. An object of class Information Text Type 508 comprises a type descriptor for textual information (e.g., "e-mail" or "memo"). The class Information Text Type 508 is related to the class Information Text 507 by a many-to-one relationship 103.

The system 200 also provides a "note" which may be attached to each object. If the textual information to be associated with an object is short, e.g., just a few lines of text, the user 201 may simply add a "note" to the object, such as a short comment or reminder. This feature saves the user 201 having to create a searchable property 102 for notes to be associated with the object.

An object of class Activation 509 comprises an activation class for users, such as "subscription". The class User 402 has a many-to-many relationship with the class Activation 509 using the cross-link class Activation to User Link 510. Similarly, the class User Group 403 has a many-to-many relationship with the class Activation 509 using the cross-link class Activation to User Group 511.

In a preferred embodiment, the system 200 also provides that some or all attachments are stored in a central location that is not accessible by other applications running under control of the same operating system (unless those other applications are launched from within the system 200).

Building and Editing a Data Model

FIG. 6 shows a flow diagram of a process for building and editing a data model of the user's object database.

At a flow point 600, the user 201 desires to build or edit the user database model 230.

In a preferred embodiment, the system 200 provides a facility for atomic transactions, using a "transaction begin" command and a "transaction end" command, to be invoked by the user 201. When the user 201 invokes the "transaction begin" command, all changes to the user database model 230 or to the relational database 250 are collected, and committed in one atomic operation when the user 201 invokes the "transaction end" command. This feature allows the user 201 to protect the user database model 230 and the relational database 250 against partial changes.

Although this flow diagram is described with regard to an order in which the system 200 examines the user's commands, in actual practice the user 201 specifies the order in which commands are to be executed, and need not follow the order indicated in this flow diagram.

At a step 610, the system determines if the user 201 chooses to build, edit or delete a class 101. If so, the system 200 proceeds to the step 612. Otherwise, the system 200 proceeds to the step 620.

At the step 612, the user 201 has chosen to build, edit or delete a class 101. If the user 201 chooses to build a new class 101, the system 200 proceeds to the step 614. If the user 201 chooses to edit an existing class 101, the system 200 proceeds to the step 616. If the user 201 chooses to delete an existing class 101, the system 200 proceeds to the step 618.

At the step 614, the system 200 creates a new object of class Class 301 in the meta-model 220. The system 200 provides a capability for the user 201 to select values for the properties 102 of the new object of class Class 301 which has just been created. For some of these properties, such as "Class DB Name", the system 200 generates a default value, but for others, it requires that the user 201 supply a value. The system 200 then returns to the step 610.

At the step 616, the user 201 selects an object of class Class 301 in the meta-model 220, and proceeds to edit that object. The system 200 receives editing commands and changes the values for the properties 102 of the object. The system 200 then returns to the step 610.

At the step 618, the user 201 selects an object of class Class 301 in the meta-model 220, and proceeds to delete that object. The system 200 removes the object from the meta-model 220, and implements any delete rules, such as deleting the objects of class Class Property 303 which relate to that object of class Class 301. The system then returns to the step 610.

At the step 620, the system determines if the user 201 chooses to build, edit or delete a class property 102. If so, the system 200 proceeds to the step 622. Otherwise, the system 200 proceeds to the step 630.

At the step 622, the user 201 has chosen to build, edit or delete a class property 102. If the user 201 chooses to build a new class property 102, the system 200 proceeds to the step 624. If the user 201 chooses to edit an existing class property 102, the system 200 proceeds to the step 626. If the user 201 chooses to delete an existing class property 102, the system 200 proceeds to the step 628. (Of course, as class properties 102 are related to classes 101, any of these actions has the effect of editing a class 101.)

At the step 624, the system 200 creates a new object of class Class Property 303 in the meta-model 220. The system 200 provides a capability for the user 201 to select values for the properties 102 of the new object of class Class Property 303 which has just been created. For some of these properties, such as "Class Property DB Name", the system 200 generates a default value, but for others, it requires that the user 201 supply a value. The system 200 then returns to the step 610.

At the step 626, the user 201 selects an object of class Class Property 303 in the meta-model 220, and proceeds to edit that object. The system 200 receives editing commands and changes the values for the properties 102 of the object. The system 200 then returns to the step 610.

At the step 628, the user 201 selects an object of class Class Property 303 in the meta-model 220, and proceeds to delete that object. The system 200 removes the object from the meta-model 220, and implements any delete rules. The system then returns to the step 610.

At the step 630, the system determines if the user 201 chooses to build, edit or delete a relationship 103 between classes 101. If so, the system 200 proceeds to the step 632. Otherwise, the system 200 proceeds to the flow point 640.

At the step 632, the user 201 has chosen to build, edit or delete a relationship 103 between classes 101. If the user 201 chooses to build a new relationship 103 between classes 101, the system 200 proceeds to the step 634. If the user 201 chooses to edit an existing relationship 103 between classes 101, the system 200 proceeds to the step 636. If the user 201 chooses to delete an existing relationship 103 between classes 101, the system 200 proceeds to the step 638. (Of course, as relationships 103 between classes 101 comprise pointer class properties and are related to classes 101, any of these actions has the effect of editing a class 101.)

At the step 634, the system 200 creates a new object of class Pointer Class Property 304 in the meta-model 220. The system 200 provides a capability for the user 201 to select values for the properties 102 of the new object of class Pointer Class Property 304 which has just been created. For some of these properties, such as "Pointer Class Property DB Name", the system 200 generates a default value, but for others, it requires that the user 201 supply a value. The system 200 then returns to the step 610.

At the step 636, the user 201 selects an object of class Pointer Class Property 304 in the meta-model 220, and proceeds to edit that object. The system 200 receives editing commands and changes the values for the properties 102 of the object. The system 200 then returns to the step 610.

At the step 638, the user 201 selects an object of class Pointer Class Property 304 in the meta-model 220, and proceeds to delete that object. The system 200 removes the object from the meta-model 220, and implements any delete rules. The system then returns to the step 610.

At the flow point 640, the user 201 does not desire to build, edit or delete any further objects in the meta-model 220, and the process is complete.

Compilation and Translation Process

FIG. 7 shows a flow diagram of a process for compilation and translation between object-oriented and relational database structures.

At a flow point 700, the user 201 desires to translate the user's object database 100 into the corresponding relational database 203.

At a step 710, the user 201, having completed editing the user model 230, triggers the translation process.

At a step 720, the system 200 selects a class 101 in the user's object database 100. If there are no more classes 101 to select in the user's object database 100, the system 200 proceeds with the step 740.

At a step 730, the system 200 creates a table in the corresponding relational database 203 to correspond to the selected class 101.

At a step 740, the system 200 creates a set of specified columns in the table. These specified columns include a column for a unique identifier ("UID") for each object, a column for the "class identifier" for each object, and a column for the "object type" for each object.

When an object is populated into the corresponding relational database 203, the system 200 will create a row in the table corresponding to the object's class 101, and in each table corresponding to a base class 101 for the object's class 101. Thus, each object will correspond to one row in each table corresponding to each class 101 which is a base class 101 for the object's class 101.

The first column in each table is for the UID for each object. Thus, in each table in which a row is created for the object, the first column corresponds to the UID for the object. This column is preferably selected to be the first, leftmost, column because many relational database engines 240 are optimized to perform indexed searches on that first column.

Another column in each table is for the "class identifier" for each object. Because an object corresponds to a row in the table for its class 101 and in each table for a base class 101 for its class 101, it is efficient to record an identifier of what class 101 each object is, in each table for which a row for that object is stored.

Another column in each table is for the "object type" for each object. Like the searchable property 102 "Class Type" in the class Class 301, the "object type" column indicates whether this particular object (as opposed to an entire class) is part of the meta-model, or is an object created by the user.

At a step 750, the system 200 creates a column in the table for a value for a searchable property 102 for the class 101. If the searchable property 102 has a built-in datatype, the column holds the actual value for that built-in datatype. Otherwise, if the searchable property 102 has a user-defined datatype, the column holds the UID for the object corresponding to the value for that user-defined datatype.

At a step 760, the system 200 creates a column in the table for each relationship 103 between the class 101 and a related class 101. In the column for this relationship 103, the system 200 places the UID of the object in the related class 101 which is related to the object in the class 101 for this table. If the relationship 103 is many-to-one, the system creates multiple records in the table for the same object, each with the UID of a different object in the related class 101.

At a flow point 770, the compilation and translation process is complete.

Sample Target Relational Database

Figure 8:
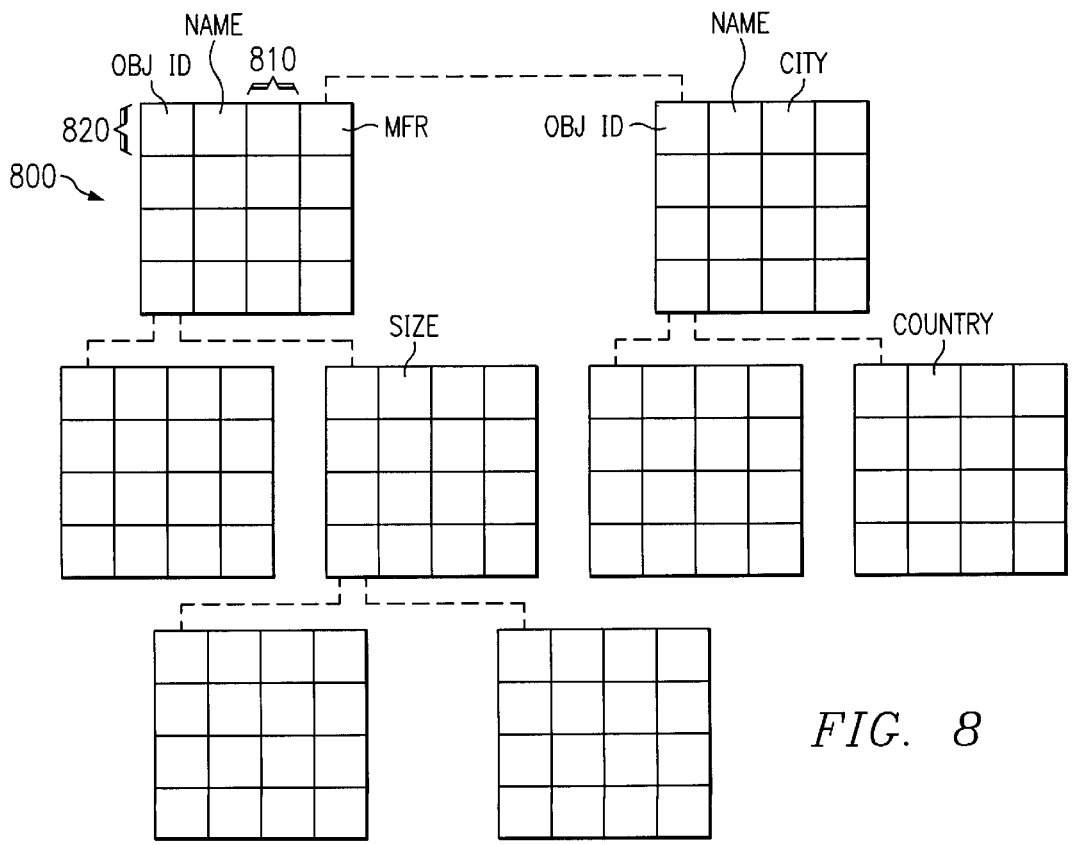
FIG. 8 shows a data model diagram of a user relational database corresponding to the sample user's object database of FIG. 1.

FIG. 8 shows a data model diagram of a user relational database corresponding to the sample user's object database of FIG. 1.

As described with regard to FIG. 7, the user relational database 230 corresponding to the user's object database 100 comprises a set of relational tables 800, each corresponding to a class 101. Accordingly, in the example of FIG. 1, the system 200 creates a table 800 component, a table 800 analog component, a table 800 memory, a table 800 dynamic memory, a table 800 static memory, a table 800 manufacturer, a table 800 domestic manufacturer, and a table 800 foreign manufacturer. Each such table 800 comprises a set of columns 810 and a set of rows 820.

The system 200 creates, for each table 800, a column 810 "Object ID" for the UID of the object, and assures that objects added to each table 800 for derived classes 101 are also added to tables 800 for the base classes 101, with corresponding UIDs. For example, each row 820 added to the table 800 static memory corresponds to a row 820 added to the table 800 memory and corresponds to a row 820 added to the table 800 component, and the UIDs are identical in the column 810 "Object ID" for these three rows 820.

The system 200 also creates for the table 800 component a column 810 "name" for the name of the component, for the table 800 memory a column 810 "size" for the size of the component, for the table 800 manufacturer a column 810 "name" for the name of the manufacturer and a column 810 "city" for its city, and for the table 800 foreign manufacturer a column 810 "country" for the country of the foreign manufacturer.

The system 200 also creates for the table 800 component a column 810 "manufacturer" for the UID of the manufacturer, identical to the UID of a row 820 in the table 800 manufacturer, thus establishing the relationship 103 between objects of the class 101 component and objects of the class 101 manufacturer.

Cascade Searching and Search Translation

FIG. 9 shows a flow diagram of a process for cascade searching of an object database and search translation between object-oriented and relational database structures.

At a flow point 900, the user 201 desires to perform a cascade search of the user's object database 100.

Specifying the Cascade Search

At a step 910, the user 201 specifies the cascade search request, i.e., the classes to be cascaded and the properties to be searched in each class. The user interface 210 receives the information from the user 201. To perform this step 910, the system 200 performs the steps 911 through 916 inclusive.

At a step 911, the user interface 210 obtains a list of classes 101 in the user database model 230 from the meta-model 220, and presents the list of classes 101 to the user 201 for selection.

In an example cascade search using the example user's object database 100 in FIG. 1, the system 200 would present the list of classes 101 available in the user database model 230.

At a step 912, the user 201 selects a class 101. The user interface 210 obtains a list of related classes 101 (i.e., classes 101 coupled to the selected class 101 by a relationship 103) in the user database model 230 from the meta-model 220, and their derived classes 101. The user interface 210 presents the list of related classes 101 and their derived classes 101 to the user 201 for selection.

In this example cascade search, the user could select the class 101 static memory. The class 101 static memory inherits all the relationships 103 of its parent class 101 memory and all the relationships 103 of its grandparent class 101 component, which includes a relationship 103 with the class 101 manufacturer.

At a step 913, the user 201 may select a related class 101 or a class 101 derived from a related class 101. So long as the user 201 continues to select related classes 101 or their derived classes 101, the system 200 continues with the step 912. When the user 201 declines to select any further related classes 101 or their derived classes 101, the system continues with the step 914.

In this example cascade search, the user 201 could select the class 101 foreign manufacturer, which is a class 101 derived from the related class 101 manufacturer.

At a step 914, for each class 101 selected by the user 201, the user interface 210 obtains a list of searchable properties (and any restrictions on their values) in the user database model 230 from the meta-model 220, and presents the list of searchable properties to the user 201 for selection.

In this example cascade search, the system 200 would present the searchable properties 102 "name" and "size" for the class 101 static memory, and would present the searchable properties 102 "name" and "country" for the class foreign manufacturer.

At a step 915, the user 201 selects at least one searchable property 102 of the selected classes 101, may specify restrictions on their values, and may continue to select searchable properties 102 of the selected classes 101. So long as the user 201 continues to select searchable properties 102, the system 200 continues with the step 914. When the user 201 declines to select any further searchable properties 102, the system continues with the step 916.

In this example cascade search, the user 201 could select the searchable property 102 "name" for the class 101 static memory to be presented, and selected the searchable property 102 "country" for the class 101 foreign manufacturer to be searched, and require that the latter must equal the text string 'France'.

In a preferred embodiment, the steps 914 and 915 may proceed in parallel with the steps 912 and 913. When the user 201 selects a class 101, the system 200 presents the searchable properties 102 in that class 101 for selection, and also presents the related classes 101 (and derived classes 101) for selection. Instead of responding to a prompt, the user 201 then uses a pointing device to select either a related class 101 (or derived class 101) or a searchable property 102, or selects a command to trigger the cascade search (in the step 916).

At a step 916, the user 201 indicates that the cascade search has been fully specified, and triggers the search. The system 200 provides a technique for the user 201 to record the specification of a cascade search, to recall the specification of a previously recorded cascade search, to edit the specification of a cascade search to create a new cascade search, and to apply a previously recorded cascade search to the current relational database 250.

In this example cascade search, the user 201 has requested a cascade search for 'the names of all static memories made by a manufacturer from France'.

Building the Query Model

At a step 920, the system 200 parses the cascade search request and builds the query model 260. To perform this step 920, the system 200 performs the steps 921 through 922 inclusive.

At a step 921, the system 200 builds a configuration object 991 for the initial class 101 selected by the user 201 to be searched. Each such configuration object 991 represents a single class 101 selected by the user 201, and comprises a first list of searchable properties 102 to be searched, a second list of searchable properties 102 to be displayed in the query result 251, and a third list of classes 101 starting with the initial class 101 selected by the user 201, and continuing with each related class 101 selected by the user 201.

At a step 922, the system 200 builds a configuration object 991 for each additional class 101 selected by the user 201 to be searched, and links each such additional configuration object 991 to the configuration object 991 for the initial class 101 selected by the user 201 to be searched.

Building the SQL Query

At a step 930, the system 200 builds the SQL query 261 in response to the query model 260. To perform this step 930, the system performs the steps 931 through 936 inclusive.

At a step 931, the system 200 re-links the configuration object 991 into a list of query model objects 992. Each query model object 992 specifies a single search field or a single result field of the cascade search.

At a step 932, the system 200 performs table alias analysis for the query model 260.

To perform this step 932, the system 200 examines the list of query model objects 992 and determines if translation of the query model 260 into SQL commands 261 would otherwise cause any table to be joined with itself, e.g., if two or more different columns of the same table appear in the query model 260. If so, the System 200 generates a unique name for an Oracle "alias" for each instance of that table after the first, creates an alias record 993 for each such alias, and attaches the alias record 993 to the list of query model objects 992. The alias record 993 indicates that the alias should be specified and the table referred to using the alias in the SQL commands 261 to be generated.

At a step 933, the system 200 performs join analysis for the query model 260.

To perform this step 933, the system 200 examines the list of query model objects 992 and determines if translation of the query model 260 into SQL commands 261 would otherwise cause any duplicate join conditions to be specified, e.g., if a first and second table are joined twice using the same join condition. If so, the system 200 selects a single one of the join conditions to be applied, creates a join record 994 for each such join condition, and attaches the join record 994 to the list of query model objects 992. The join record 994 indicates that the single join condition should be specified, and that duplicate join conditions should be omitted, in the SQL commands 261 to be generated.

At a step 934, the system 200 performs search condition analysis for the query model 260.

To perform this step 934, the system 200 examines the list of query model objects 992 for each of the search conditions shown in table 9-1, creates a condition record 995 for each search condition, and attaches the condition record 995 to the list of query model objects 992.

TABLE 9-1

- Comparison of a searchable property with a numeric value, represented in the SQL commands using a "WHERE" clause and a logical comparison of a column in the relational database 250 with that numeric value.
- Comparison of a searchable property with a text string, represented in the SQL commands using a "WHERE" clause and a logical comparison of a column in the relational database 250 with that text string. If the text string to be compared comprises "wildcards" (e.g., special characters to indicate matching with one or more arbitrary characters), the comparison is represented in the SQL commands using the Oracle "LIKE" statement. If the text string to be compared is case-insensitive, the comparison is represented in the SQL commands using an Oracle statement for forcing case to upper case. Other string operations are converted to appropriate Oracle statements using a conversion table.

TABLE 9-1-continued

○ Comparison of a searchable property using a different unit of measurement, represented in the SQL commands using the appropriate conversion function for the source and target units of measurement, as recorded in the meta-model 220.
○ Multiple comparisons of multiple searchable properties, or other boolean operations on comparisons, represented in the SQL commands using boolean logical operators such as "AND", "OR", and "NOT".
○ Comparison of a searchable property with a group of numeric or text string values, or a range of numeric values, represented in the SQL commands using a plurality of comparisons of the same searchable property with different numeric or text string values.

In a preferred embodiment, when a cascade search relates to a searchable property 102 having a unit of measurement, the system 200 examines the units of measurement for the searchable property 102 and for the value it is being compared against, and if they are not the same, adjusts the SQL commands 261 to account for different units of measurement.

To make this adjustment, the system 200 examines the object of class Class Property 303 for the searchable property 102, and searches the meta-model 200 for the object of class Unit of Measurement 310 associated (as a storage unit of measurement) with that object of class Class Property 303. The system 200 then examines the query model 260, determines the unit of measurement for the cascade search, and searches the meta-model 200 for the object of class Unit of Measurement 310 associated with that unit of measurement. The system 200 then searches the meta-model 200 for the object of class Unit Conversion Formula 311 which converts the first unit of measurement to the second, and inserts a call to that unit conversion formula into the SQL commands 261.

At a step 935, the system 200 performs optimization analysis for the query model 260.

To perform this step 935, the system 200 examines the query model 260 for each of the optimization conditions shown in table 9-2, and modifies the query model 260 to generate SQL commands 261 according to the optimization techniques shown therein.

TABLE 9-2

Row Selectivity. A value for "Row Selectivity" is computed by the system for each searchable property, according to the following formula:

$$\text{Row Selectivity} = \frac{\text{\# of distinct values}}{\text{\# of objects with non-null values}}$$

Row Selectivity is multiplied by 100 to normalize it as a percentage, and used to determine if the column modeling that searchable property should be indexed. If the Row Selectivity of a column is more than 70%, the column is almost always indexed; if the Row Selectivity of a column is less than 30%, the column is almost never indexed.
Avoiding Sort/Merge. Using multiple indexed columns in a WHERE clause causes the Oracle RDBMS to perform a sort/merge operation. As sort/merge operations take substantial time, the system 200 attempts to replace such constructs with WHERE clauses which use only one indexed column.
To cause an indexed column to be treated by the Oracle RDBMS as non-indexed, the value to be searched is changed from the raw column value, table.column, to a computed value, table.column+0 (for numeric values) or table.column||'' (for text string values).
Otherwise, where a column is indexed, the system attempts to write SQL commands to require the Oracle RDBMS to treat that TABLE 9-2-continued column as indexed. When a function or arithmetic operation is applied to a column value, the Oracle RDBMS does not treat the column as being indexed. Accordingly, the system prefers to avoid these constructs. For example, "WHERE frequency = 3000" is preferred to "WHERE frequency/3 = 1000".
Array Fetching. When large numbers of rows are to be selected from a table, the system attempts to fetch those rows into an array, for faster retrieval.
Search Condition Ranking. When the system prefers a certain search condition order, for faster retrieval, it may alter the nature of the search conditions to place them in formats which cause the Oracle RDBMS to assign search priority in the order the system prefers.
Table Name Sequence. In a FROM clause, the "driving" table, i.e., the table which is an intersection table, or the table with the smaller number of records if there is no intersection table, is placed at the end of a FROM clause. Other tables in the FROM clause are ordered similarly.
Condition Predicate Sequence. In a WHERE clause, the "driving" condition predicate, i.e., the most efficient condition predicate that will return the fewest records, is placed at the beginning of a WHERE clause. Other condition predicates are ordered similarly.
Booster Engines. In a WHERE clause, if the selected condition predicate would cause the Oracle RDBMS to perform a non-indexed search, a secondary condition predicate is added to first perform an indexed search and reduce the number of records to be searched.
For example, the SQL command "SELECT . . . FROM part WHERE UPPER(part.partnumber) = UPPER( 'DM54ALS114AJ')" would perform a non-indexed search because each part.partnumber would have to be converted to upper case. (This is simply a case-insensitive search on part.partnumber.) Instead, the system prefers the SQL command "SELECT . . . FROM part WHERE UPPER(part.partnumber) = UPPER( 'DM54ALS114AJ') AND (part.partnumber LIKE 'D%54%114%')", where all alphabetic characters except the first have been replaced with Oracle wildcards in the search text. The LIKE clause is performed as an indexed search and is thus much faster, and also reduces the number of records which must be manipulated and checked for the case-insensitive comparison.
Table Aliases. The system prefers to use table aliases and to prefix column names with their aliases whenever there is more than one table specified in the FROM clause of a SELECT statement, as this provides for faster parsing time.
Preferred Constructs. Certain SQL statements are preferred for efficiency, even though their alternatives are functionally equivalent. For example, in general, the NOT EXISTS construct is preferred to the NOT IN construct, the EXISTS construct is preferred to the DISTINCT construct, the WHERE construct is preferred to the HAVING construct, and table joins are preferred to sub-queries.
NOT and OR Operators. The system prefers to avoid WHERE clauses which use a negated operator, such as NOT EQUALS, because the Oracle RDBMS performs a non-indexed table scan in these case.
Similarly, in a WHERE clause which has multiple index predicates separated by logical OR, the most specific index predicate is placed at the beginning of the WHERE clause. If the logical OR clause refers to two indexed columns, the system prefers to use the UNION construct to select all rows which satisfy either condition predicate.

The SQL commands 261 are dynamically generated in response to the query model 260 and the list of query model objects 992, which are themselves generated in response to the cascade search specified by the user 201. Each cascade search is potentially quite different, so the system 200 first provides for generating SQL commands 261 to perform the cascade search function, and then provides for optimizing those SQL commands 261 so as to perform the search in an efficient manner.

Those skilled in the art will recognize, after perusal of this application, that other and further optimizations of SQL commands 261 generated by the system 200 are possible, that such other and further optimizations are within the scope and spirit of the invention, and that such other and further optimizations would not require either invention or undue experimentation.

At a step 936, the system 200 examines the query model 260, the list of query model objects 992, the alias records 993, the join records 994, and the condition records 995, and in response, generates SQL commands 261 using the form shown in table 9-3.

TABLE 9-3

| "SELECT <result> | FROM <tables and aliases> |
| | WHERE <JOIN of tables> |
| | AND <conditions>" |

The form in table 9-3 includes a  section for specifying the form of the query results 251, a <tables and aliases> section for specifying the tables in the relational database 250 to be searched, a <JOIN of tables> section for specifying how the tables to be searched are joined, and a <conditions> section for specifying additional conditions to be met by those records to be retrieved. There may also be additional SQL statements after the <conditions> section, such as a section for the SQL "GROUP BY", "ORDER BY" or other statements.

Information regarding the form of the query results 251 to be presented to the user 201 is inserted in the <result> section of the SQL commands 261. In a preferred embodiment, the information regarding the form of the query results 251 comprises a sequence of columns to be selected (using the SQL "SELECT" statement) from tables in the relational database 250. The sequence of columns to be selected comprises those columns requested by the user 201 when specifying the cascade search.

In this example cascade search, the system 200 would generate SQL commands 261 with a result section specifying the class 101 static memory and the searchable property 102 "name". The SQL commands 261 would thus begin with a statement such as "SELECT static_memory.name".

Information regarding the tables (and aliases of tables) in the relational database 250 to select data from is inserted in the <tables and aliases> section of the SQL commands 261. In a preferred embodiment, the information regarding the tables and aliases comprises a sequence of tables and aliases of tables to be joined from the relational database 250 into a single joint table to be searched. The choice and order of the tables and aliases to be joined is retrieved from the alias records 992 and the join records 993 created by the system 200.

In this example cascade search, the system 200 would generate SQL commands 261 with a result section specifying the class 101 static memory and the searchable property 102 "name". The SQL commands 261 would thus continue with a statement such as "FROM static_memory, memory, component, foreign_manufacturer, manufacturer".

Information regarding the conditions to be met is inserted into the <conditions> section of the SQL commands 261. In a preferred embodiment, the information regarding the conditions to be met comprises a sequence of logical operators (using the SQL "WHERE" statement, and using the SQL "AND" statement where there are multiple conditions) which must be met by records selected from the relational database 250. The choice and order of the conditions to be met is retrieved from the condition records 994 created by the system 200.

In this example cascade search, the system 200 would generate SQL commands 261 with a condition section specifying the logical conditions required by the user 201, by reference to the searchable properties 102 of the specified classes 101. The SQL commands 261 would thus continue with a statement such as "WHERE (manufacturer.country= 'France')".

In addition to logical conditions imposed by the user, the <conditions> section must impose any logical requirements for JOIN of tables 800. There are two types of JOIN, those required by inheritance relationships between classes 101, and those required by data-model relationships 103 between classes 101.

As noted with regard to FIG. 8, inheritance relationships are modeled by providing a column 810 "Object ID" in each table 800; when an object of a derived class 101 is created in the relational database 250, a row 820 is provided in both the base class 101 and the derived class 101, with the same object UID for that object for both tables 800. Thus, inheritance relationships are modeled in the SQL commands 261 by a JOIN statement relating to the identity of the two object UIDs, and by the parent/child relationship recorded in the meta-model 220.

In this example cascade search, the system 200 would generate SQL commands 261 with a condition section specifying the inheritance relationship between the class 101 static memory, its parent class 101 memory, and its grand-parent class 101 component. The SQL commands 261 would thus continue with a statement such as "AND (static_ memory.objectID=memory.objectID) AND (memory.objectID=component.objectID)". Similarly, the SQL commands 261 would also continue with a statement such as "AND (manufacturer.objectID=foreign_ manufacturer.objectID).

In practice, because the user 201 has not made reference to any searchable properties 102 of the class 101 memory, there is no need to explicitly require use of the table 800 memory, and there is thus no need to require matching object UIDs in that table 800. The system 200 would thus omit the inheritance JOIN for this table.

As noted with regard to FIG. 8, data-model relationships 103 between source and target classes 101 are modeled by providing a column 810 in the source table 800 pointing to an object in the target table 800, i.e., having the object UID of a row 820 in the target table 800. Thus, data-model relationships 103 are also modeled in the SQL commands 261 by a JOIN statement relating to the identity of a pointer with an object UID, and by the data-model relationship recorded in the meta-model 220.

In this example cascade search, the system 200 would generate SQL commands 261 with a condition section specifying the data-model relationship 103 between the class 101 component and the class 101 manufacturer. The SQL commands 261 would thus continue with a statement such as "AND (component.manufacturerID = manufacturer.objectID)".

Thus, in this example cascade search, the SQL commands 261 would be like that shown in table 9-4.

TABLE 9-4

SELECT SM.name
FROM component C,
    static_memory SM,
    manufacturer M,
    foreign_manufacturer FM
WHERE (FM.country = 'France')
    AND (M.objectID = FM.objectID)
    AND (C.manufacturerID = M.objectID)
    AND (SM.objectID = C.objectID).

Note that these SQL commands 261 are generated by the system 200 in response to the user's specification of the cascade search, as applied to the user database model 230, and the translation of the user database model 230 into the user relational database 231. The system 200 provides the dynamic translation of the cascade search, seamlessly translating between the object-oriented model used by the cascade search and the user database model 230, on the one hand, and the relational model used by the user relational database 231 and the SQL commands 261, on the other hand.

At a step 940, the system 200 transmits the SQL query 261 to the relational database engine 220.

At a step 950, the relational database engine 220 applies the SQL query 261 to the corresponding relational database 203, creates the results table 262, and transmits the results table 262 to the user interface 210.

At a step 960, the user interface 210 presents the information in the results table 262 to the user 201.

The results table 262 is preferably presented to the user 201 like a relational tables showing objects found by the cascade search and each searchable property 102 the user 201 selected for display.

In a preferred embodiment, the user interface 210 also provides the user 201 with the option to display objects found by the cascade search and their searchable properties 102 in a form for comparison, e.g., side by side in a spreadsheet format. In the comparison format, the user may view searchable properties 102 of the objects, edit searchable properties 102 for the objects, either individually or for multiple objects at once, and perform comparisons between objects, such as displaying those searchable properties 102 which differ from a selected object.

At a flow point 970, the cascade search is complete.

ALTERNATIVE EMBODIMENTS

Although preferred embodiments are disclosed herein, many variations are possible which remain within the concept, scope, and spirit of the invention, and these variations would become clear to those skilled in the art after perusal of this application.

We claim:

1. A system, comprising
    means for receiving a description of a user's object database, said user's object database having a set of classes and a set of relationships between pairs of said classes;
    means for creating a model of said user's object database in response to said description, said model persisting after creation of a relational database and including a correspondence between said user's object database and said relational database;
    memory having space for storing said model;
    means for creating said relational database in response to said model, said relational database having a set of tables, keys for said tables, and relationships between pairs of said tables implementing said classes, objects and relationships of said user's object database;
    means for receiving a set of data objects for said user's object database after creation of said relational database;
    means for translating said set of data objects for said user's object database into a set of records for said relational database in response to said model, and for inserting said set of records into said relational database;
    means for receiving updates to said description of a user's object database after creation of said relational database;
    means for updating said model in response to said updates to provide an updated model;
    means for updating said relational database in response to said updated model; and
    means for updating said set of records for said relational database in response to said means for updating said relational database.

2. A system as in claim 1, comprising
    a relational database server, said server comprising means for accepting a set of relational database commands;
    wherein said means for translating and for inserting comprises means for generating a set of relational database commands.

3. A system as in claim 1, wherein said means for inserting comprises
    means for generating records for said tables;
    means for generating values for said keys for said records; and
    means for causing said values for said keys for said records to correspond to said relationships between pairs of tables.

4. A system as in claim 1, wherein said means for inserting comprises means for maintaining said tables, keys for said tables, and said relationships between pairs of tables while inserting said set of records into said relational database.

5. A system as in claim 1, wherein said means for updating said model is operative to update said model after said relational database includes records corresponding to said data objects.

6. A system as in claim 1, wherein
    said set of classes includes at least a first class and a second class, said second class being a subclass of said first class;
    said set of data objects including a data object in said second class;
    said set of tables including a first table corresponding to said first class and a second table corresponding to said second class;
    wherein said data object in said second class corresponds to a composite of a first record in said first table and to a second record in said second table.

7. A system, comprising
    means for receiving a description of a user's object database, said user's object database having a set of classes and a set of relationships between pairs of said classes;
    means for creating a model of said user's object database in response to said description, said model comprising an object database and a correspondence with a corresponding set of relational tables, said relational tables having
        a first class of objects corresponding to a first relational table for which each row represents a class in the user's object database,
        an object of said first class corresponding to each said one class in said user's object database and being represented by a row in said first relational table,
        a second class of objects corresponding to a second relational table for which each row represents a relationship in the user's object database, and
        an object of said second class corresponding to each said one relationship in said user's object database and being represented by a row in said second relational table; and
    means for creating a relational database in response to said model, said relational database having a set of tables each one of which corresponds to one said class in said user's object database, keys for said tables including a key for each said table representing a unique object identifier, and relationships between pairs of said tables implementing said classes, objects and relationships of said user's object database.

8. A system as in claim 7, comprising
a relational database server, said server comprising means for accepting a set of relational database commands;
wherein said means for creating a relational database comprises means for generating a set of relational database commands.

9. A system as in claim 7, wherein said server comprises means for accepting a set of relational database commands from a second source of said commands.

10. A system, comprising
means for receiving a description of a user's object database, said user's object database having a set of classes and a set of relationships between pairs of said classes;
means for creating a model of said user's object database in response to said description, said model persisting after creation of a relational database and including a correspondence between said user's object database and said relational database;
means for creating said relational database in response to said model, said relational database having a set of tables, keys for said tables, and relationships between pairs of said tables implementing said classes, objects and relationships of said user's object database; and
means for receiving updates to said description after creating said relational database, for updating said model in response to said updates to generate an updated model, and for updating said relational database in response to said updated model.

11. A system as in claim 10, comprising means for receiving a triggering signal, wherein said means for updating said relational database operates in response to said triggering signal.

12. A system as in claim 10, wherein said means for creating a model and for updating said model is operative after said relational database includes records corresponding to said objects in said said user's object database.

13. A system as in claim 10, wherein said means for creating a relational database and for updating said relational database is responsive to said means for creating a model and for updating said model so as to update said objects and relationships in said relational database after said relational database includes records corresponding to said objects in said said user's object database.

14. A system, comprising
means for receiving a description of a user's object database, said user's object database having a set of classes and a set of relationships between pairs of said classes;
means for creating and storing a model of said user's object database in response to said description, said model persisting after creation of a relational database and including a correspondence between said user's object database and said relational database;
means for creating a relational database in response to said model, said relational database having a set of tables, keys for said tables, and relationships between pairs of said tables implementing said classes, objects and relationships of said user's object database;
means for receiving a description of a query against said user's object database after creation of said relational database; and means for translating said query, responsive to said stored model, into a relational database query suitable for application to said relational database.

15. A system as in claim 14, comprising
means for applying said relational database query to said relational database; and
means for presenting an output of said means for applying.

16. A method for searching a database, said database having a plurality of classes, at least one searchable property associated with one of said classes, and at least one data-model relationship between a pair of said classes, said method, comprising the steps of
creating a meta-model of said database, said meta-model persisting after creation of a relational database, and relating at least one of said plurality of classes with a corresponding relational table of said relational database in a dynamic correspondence;
specifying a query model in response to said meta-model, said query model comprising a first class and at least one searchable property associated with said first class, a second class related to said first class by a first said data-model relationship, and at least one searchable property for said second class;
translating said query model into a set of relational database commands in response to said meta-model;
applying said relational database commands to a relational database and retrieving a query result in response thereto; and
displaying said query result.

17. A method as in claim 16,
wherein said relational database comprises a set of relational tables; and
wherein said step of translating comprises the steps of
identifying a first relational table associated with said first class and a second relational table associated with said second class;
first generating at least one database command to join said first relational table and said second relational table to produce a relational join, responsive to a data-model relationship between said first class and said second class;
identifying a first column associated with said first searchable property; and
second generating at least one database command to test records of said relational join in said column, responsive to a test for said searchable property.

18. A method as in claim 16,
wherein said relational database comprises a set of relational tables; and
wherein said step of translating comprises the steps of
identifying a first relational table associated with said first class and a second relational table associated with a base class of said first class;
first generating at least one database command to join said first relational table and said second relational table to produce a relational join, responsive to an inheritance relationship between said first class and said base class of said first class;
identifying a first column associated with said first searchable property; and
second generating at least one database command to test records of said relational join in said column, responsive to a test for said searchable property.

19. A method as in claim 16, wherein said step of translating comprises
  generating a set of database commands to perform a query represented by said query model; and
  optimizing said set of database commands to perform a faster query of said relational database.

20. A method for searching an object-oriented database, said database having a plurality of classes, at least one searchable property associated with one of said classes, and at least one data-model relationship between a pair of said classes, said classes searchable property, and data-model relationship being described in a meta-model of said object-oriented database, said meta-model persisting after creation of a corresponding relational database, said method, comprising the steps of
  presenting a first list of said classes;
  receiving a selection of a first class from said first list;
  receiving a selection of a searchable property associated with said first class;
  presenting a second list of said classes, said second list comprising classes having a base class related to said first class by a said data-model relationship;
  receiving a selection of a second class from said second list;
  receiving a selection of a searchable property associated with said second class;
  generating a set of relational database commands, said set of relational database commands being effective to present a query to said relational database corresponding to said object-oriented database, said query having the semantic effect of said selections of said first class, said first searchable property, said second class, and said second searchable property for both said object-oriented database and for said relational database;
  applying said set of relational database commands to said relational database and retrieving a query result in response thereto; and
  displaying said query result.

21. A method as in claim 20, wherein said set of relational database commands comprise at least one table join responsive to a data-model relationship in said database.

22. A method as in claim 20, wherein said set of relational database commands comprise at least one table join responsive to an inheritance relationship in said database.

23. A method as in claim 20, wherein
  said database comprises at least one searchable property associated with a first unit of measurement; and
  said set of relational database commands comprise at least one comparison responsive to a conversion of said first unit of measurement to a second unit of measurement.

24. A method as in claim 20, wherein said step of generating is responsive to a meta-model of said database, said meta-model comprising a first class of objects representative of classes of said database and a second class of objects representative of searchable properties of said database.

25. A system, including
  a user interface disposed to receive information descriptive of an object-oriented database;
  a meta-model representative of a correspondence between said object-oriented database and a relational database, and persisting after creation of said relational database;
  a translator, responsive to said meta-model, from said object-oriented database to said relational database;
  wherein said user interface is capable of receiving searchable information for entry into said object-oriented database, and said translator is capable of translating, responsive to said meta-model, said searchable information into rows in said relational database;
  wherein said user interface is capable of receiving information descriptive of changes to said object-oriented database after said rows have been included in said relational database; and said translator is capable of translating, responsive to said meta-model, said changes into changes in said relational database; and
  wherein said user interface is capable of receiving information descriptive of searches on said searchable information in said object-oriented database, and said translator is capable of translating, responsive to said meta-model, said searches into queries for application to said relational database.

26. A system as in claim 25, wherein said information descriptive of searches is responsive to searches defined by user after said searchable information has been translated into changes in said relational database.

27. A system as in claim 25, wherein said user interface is capable of receiving information descriptive of changes to said searchable information after said searchable information has been translated into changes in said relational database.

28. A system, including
  a user interface disposed to interactively receive information descriptive of an object-oriented database;
  a meta-model representative of a correspondence between said object-oriented database and a relational database, and persisting after creation of said relational database;
  a translator, responsive to said meta-model, from said object-oriented database to said relational database;
  wherein said user interface is capable of interactively receiving searchable information for entry into said object-oriented database, and said translator is capable of dynamically translating, responsive to said meta-model, said searchable information into rows in said relational database.

29. A system as in claim 28, wherein said user interface is capable of interactively receiving information descriptive of changes to said object-oriented database after said rows have been included in said relational database; and said translator is capable of dynamically translating, responsive to said meta-model, said changes into changes in said relational database.

30. A system as in claim 28, wherein said user interface is capable of interactively receiving information descriptive of searches on said searchable information in said object-oriented database, and said translator is capable of dynamically translating, responsive to said meta-model, said searches into queries for application to said relational database.

31. A system as in claim 28, wherein said meta-model includes a set of predefined classes for modeling access control to aspects of said object-oriented database.

32. A system as in claim 28, wherein said meta-model includes a set of predefined classes for modeling attachment of graphics and text to objects in said object-oriented database.

33. A system as in claim 28, wherein said meta-model includes
  a meta-model object database having a first class representative of classes in said object-oriented database, and a second class representative of relationships in said object-oriented database;

a meta-model relational database corresponding to said meta-model object database, having a first table corresponding to said first class and having a row in said first table for each class in said object-oriented database, and having a second table corresponding to said second class and having a row in said second table for each relationship in said object-oriented database.

34. A system as in claim 33, wherein said meta-model object database includes a third class representative of searchable properties in said object-oriented database; and said meta-model relational database includes a third table corresponding to said third class and having a row in said third table for each searchable property in said object-oriented database.

35. A system as in claim 28, wherein said relational database includes one table for each class in said object-oriented database;

each said table includes an identifier column for a unique object identifier for each object in said table;

each inheritance relationship in said object-oriented database is represented by said unique object identifier appearing in said identifier column for a parent table and for a child table; and each data-model relationship in said object-oriented database is represented by said unique object identifier appearing in said identifier column for a first table and in a column other than said identifier column for a second table.

36. A system as in claim 37, wherein each searchable property of a class in said object-oriented database is represented by a column in said table for said class; and each object in a class in said object-oriented database is represented by a row in said table for said class.

* * * * *